(12) United States Patent
Tyler et al.

(10) Patent No.: US 11,571,014 B2
(45) Date of Patent: Feb. 7, 2023

(54) ENERGY AND PROTEIN BAR

(71) Applicant: STOKELY-VAN CAMP, INC., Chicago, IL (US)

(72) Inventors: Janique Tyler, Palatine, IL (US); Yosuf Chaudhry, Carpentersville, IL (US); Mark Nisbet, Barrington, IL (US)

(73) Assignee: Stokely-Van Camp, Inc., Chicago, IL (US)

( * ) Notice: Subject to any disclaimer, the term of this patent is extended or adjusted under 35 U.S.C. 154(b) by 301 days.

(21) Appl. No.: 16/400,387

(22) Filed: May 1, 2019

(65) Prior Publication Data
US 2020/0345052 A1 Nov. 5, 2020

(51) Int. Cl.
*A23L 27/30* (2016.01)
*A23L 33/19* (2016.01)
(Continued)

(52) U.S. Cl.
CPC ............ *A23L 33/185* (2016.08); *A23L 19/01* (2016.08); *A23L 27/33* (2016.08); *A23L 33/105* (2016.08); *A23L 33/115* (2016.08); *A23L 33/19* (2016.08); *A23P 30/10* (2016.08); *A23V 2002/00* (2013.01); *A23V 2250/5424* (2013.01); *A23V 2250/61* (2013.01); *A23V 2300/24* (2013.01); *A23V 2300/31* (2013.01)

(58) Field of Classification Search
CPC ............ A23V 2002/00; A23V 2250/54; A23V 2250/24; A23L 2/60; A23L 7/126; A23L 2/52; A23L 33/10; A23L 7/122; A23L 27/30; A23L 2/02; A23L 33/19; A23L 33/115; A23L 27/33; A23L 19/01; A23P 30/20; A23P 20/20; A23P 20/10; A23P 30/10; A23J 1/00
See application file for complete search history.

(56) References Cited

U.S. PATENT DOCUMENTS 4,055,676 A 10/1977 Foulkes
6,656,516 B1 12/2003 Frost et al.
(Continued)

FOREIGN PATENT DOCUMENTS

CA 2895462 A1 7/2014
CN 102342405 A 2/2012
(Continued)

OTHER PUBLICATIONS

Saravacos, George D. and Athanasios E. Kostaropoulos, Handbook of Food Processing Equipment, kluwer Academic/Plenum Publishers, 2002, pp. 138-141. https://www.google.com/books/edition/Handbook_of_Food_Processing_Equipment/DzLACdHHg2AC?hl=en&gbpv=1&dq=cutting+force+and+food&pg=PA140&printsec=frontcover (Year: 2002).*
(Continued)

*Primary Examiner* — Hong T Yoo
(74) *Attorney, Agent, or Firm* — Barnes & Thornburg LLP; Jessamine G. Pilcher

(57) ABSTRACT

A food bar includes a mixture of dry ingredients including a protein and a binder including a sweetener. The food bar is able to maintain an initial texture so that the amount of force required to cut the food bar after storage of the food bar is substantially the same as the amount of force required to cut the food bar initially.

16 Claims, 1 Drawing Sheet

(51) Int. Cl.
*A23L 33/185* (2016.01)
*A23L 33/105* (2016.01)
*A23L 33/115* (2016.01)
*A23P 30/10* (2016.01)
*A23L 19/00* (2016.01)

(56) References Cited

U.S. PATENT DOCUMENTS

| | | |
|---|---|---|
| 7,419,695 B1 | 9/2008 | Taillie et al. |
| 2005/0002989 A1 | 1/2005 | Palmer et al. |
| 2005/0095321 A1 | 5/2005 | Heywood et al. |
| 2005/0226960 A1 | 10/2005 | Boice et al. |
| 2006/0008555 A1 | 1/2006 | Merrill et al. |
| 2007/0042106 A1 | 2/2007 | Wagner et al. |
| 2007/0042107 A1* | 2/2007 | Kenneth ............ A23L 21/00 426/656 |
| 2007/0122529 A1 | 5/2007 | Thai et al. |
| 2007/0231453 A1 | 10/2007 | Bovetto et al. |
| 2010/0310750 A1 | 12/2010 | She et al. |
| 2011/0039004 A1* | 2/2011 | Garter ............... A23L 29/30 426/548 |
| 2011/0274741 A1 | 11/2011 | Horton |
| 2012/0064209 A1 | 3/2012 | Ardisson-Korat et al. |
| 2013/0084360 A1 | 4/2013 | Capodieci |
| 2015/0004285 A1 | 1/2015 | Mateus et al. |
| 2015/0257417 A1 | 9/2015 | Woll et al. |
| 2015/0320057 A1 | 11/2015 | Cha et al. |
| 2017/0208853 A1 | 7/2017 | Gallardo et al. |
| 2018/0055082 A1 | 3/2018 | Nair et al. |

FOREIGN PATENT DOCUMENTS

| | | |
|---|---|---|
| CN | 104186656 A | 12/2014 |
| JP | 2004269359 A | 9/2004 |
| JP | 2006280274 A | 10/2006 |
| KR | 20170017972 A | 5/2018 |

OTHER PUBLICATIONS

Koc, Duygu, Arfie Dogan and Bulent Bek, Bite Force and Influential Factors on Bite Force Measurements: A Literature Review, European Journal of Dentistry, Apr. 2010, vol. 4, pp. 223-231. (Year: 2010).*

Joana Sofia Coelho Das Neves, "Physical Stability of High Protein Bars During Shelf-life," Masters Dissertation, Tenico Lisboa, Sep. 2016.

Mintel, "Summer Fruits Cereal Bars," Nov. 22, 2018, retrieved from www.gnpd.com.

Mintel, "Yogurty Fruit & Nut Bites," Jul. 13, 2017, retrieved from www.gnpd.com.

Sani, Ali Mohamadi, "Determination of grape juice concentrate composition," Nutrition and food Science, 2013, 43, 462-466.

Nualkaekul, Sawaminee et al., "Investigation of the factors influencing the survival of Bifidobacterium longum in model acidic solutions of fruit juices," Food Chemistry, 2011, 129, 1037-1044.

International Search Report and Written Opinion Issued for PCT/US2020/030454, dated Sep. 2, 2020, 25 pages.

Mintel, "Chocolate & Caramel Cereal Bars with Fudge Chunks," Nov. 22, 2018, retrieved from www.gnpd.com.

International Preliminary Report on Patentability issued in PCT/US2020/030454 dated Nov. 11, 2021.

\* cited by examiner

ENERGY AND PROTEIN BAR

BACKGROUND

The present disclosure relates to food products, and particularly to food products capable of being stored. More particularly, the present disclosure relates to food bars.

SUMMARY

According to the present disclosure, a food bar includes a mixture of dry ingredients comprising a protein and a binder comprising a sweetener and an acid.

In illustrative embodiments, the food bar has an initial cutting force of less than about 20,000 N/kg and the cutting force for the food bar increases less than 75% after six months at 73° F. In illustrative embodiments, the initial cutting force is less than about 15,000 N/kg. In some illustrative embodiments, the initial cutting force is less than about 12,000 N/kg.

In some embodiments, the mixture of dry ingredients includes the protein, a fruit base, a dairy base, a flavoring, a colorant, produce fragments, and mixtures and combinations thereof.

In some embodiments, the binder includes the sweetener, the acid, a fat, a fruit concentrate, a water-activity modulator, and mixtures and combinations thereof.

In some illustrative embodiments, the mixture of dry ingredients and the binder are combined and pressed into food bars.

Additional features of the present disclosure will become apparent to those skilled in the art upon consideration of illustrative embodiments exemplifying the best mode of carrying out the disclosure as presently perceived.

DETAILED DESCRIPTION

Figure 1:
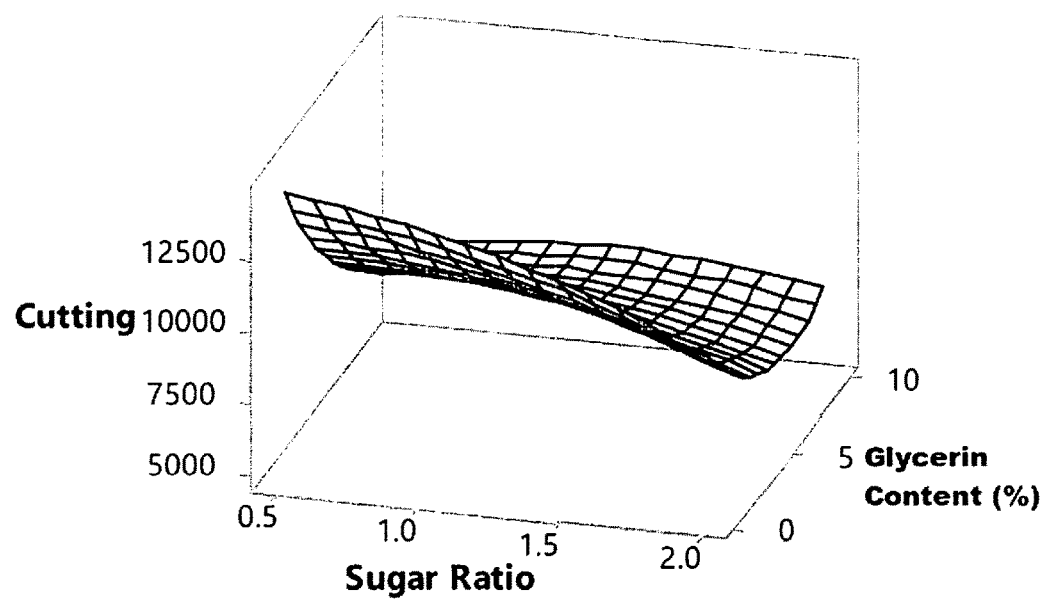
FIG. 1 shows a graph with Cutting force (N/kg) on the y-axis, sugar ratio (fruit concentrate:sweetener) on the x-axis, and glycerin content (%) on the z-axis.

A formulation for a food bar comprises a mixture of dry ingredients comprising a protein and a binder comprising a sweetener and an acid. The food bar is capable of maintaining a cutting force while minimizing discoloration while the food bar is in storage. In some embodiments, the food bar exhibits a cutting force after storage for a period of time that is within 75% of the initial cutting force. In other words, the food bar does not harden or become brittle to a significant extent after storage for a period of time. The bar, in some embodiments, exhibits minimal discoloration after storage for a period of at least 6 months.

The food bar according to the present disclosure has a particular cutting force that is measured as the amount of force required to cut through the food bar. Illustratively, the cutting force measurement mimics the amount of force required to bite into the food bar with a consumer's teeth. As described in the Examples, the amount of force required to cut through a food bar can be measured at a variety of time points to understand how the texture of the food bar changes during storage. Illustratively, the cutting force can be measured after formation (an initial cutting force) or at set time points during storage at a particular temperature.

In some embodiments, the food bar has an initial cutting force less than about 20,000 N/kg, less than about 18,000 N/kg, less than about 15,000 N/kg, less than about 12,000 N/kg, less than about 10,000 N/kg, or less than about 8,000 N/kg. In some exemplary embodiments, the initial cutting force is less than about 7,500 N/kg, less than about 7,000 N/kg, or less than about 6,500 N/kg. In some embodiments, the food bar has an initial cutting force of about 2,000 N/kg, about 2,500 N/kg, about 3,000 N/kg, about 3,500 N/kg, about 4,000 N/kg, about 4,500 N/kg, about 5,000 N/kg, about 5,500 N/kg, about 5,600 N/kg, about 5,700 N/kg, about 5,800 N/kg, about 5,900 N/kg, about 6,000 N/kg, about 6,100 N/kg, about 6,200 N/kg, about 6,300 N/kg, about 6,400 N/kg, about 6,500 N/kg, about 6,600 N/kg, about 6,700 N/kg, about 6,800 N/kg, about 6,900 N/kg, about 7,000 N/kg, about 7,100 N/kg, about 7,200 N/kg, about 7,300 N/kg, about 7,400 N/kg, about 7,500 N/kg, about 7,600 N/kg, about 7,700 N/kg, about 7,800 N/kg, about 7,900 N/kg, about 8,000 N/kg, about 8,100 N/kg, about 8,200 N/kg, about 8,300 N/kg, about 8,400 N/kg, about 8,500 N/kg, about 8,600 N/kg, about 8,700 N/kg, about 8,800 N/kg, about 8,900 N/kg, about 9,000 N/kg, about 9,100 N/kg, about 9,200 N/kg, about 9,300 N/kg, about 9,400 N/kg, about 9,500 N/kg, about 9,600 N/kg, about 9,700 N/kg, about 9,800 N/kg, about 9,900 N/kg, about 10,000 N/kg, about 10,200 N/kg, about 10,400 N/kg, about 10,600 N/kg, about 10,800 N/kg, about 11,000 N/kg, about 11,200 N/kg, about 11,400 N/kg, about 11,600 N/kg, about 11,800 N/kg, about 12,000 N/kg, about 12,200 N/kg, about 12,400 N/kg, about 12,600 N/kg, about 12,800 N/kg, about 13,000 N/kg, about 13,200 N/kg, about 13,400 N/kg, about 13,600 N/kg, about 13,800 N/kg, about 14,000 N/kg, about 14,200 N/kg, about 14,400 N/kg, about 14,600 N/kg, about 14,800 N/kg, about 15,000 N/kg, or about 15,500 N/kg. In some embodiments, the initial cutting force of the food bar is in a range of about 3,000 N/kg to about 15,500 N/kg, about 4,000 N/kg to about 12,000 N/kg, about 4,000 N/kg to about 10,000 N/kg, about 5,800 N/kg to about 10,000 N/kg, or about 5,800 N/kg to about 9,500 N/kg.

In some embodiments, the food bar has a cutting force after being stored for a particular time and at a particular temperature. Illustratively, storing the food bar at a higher temperature accelerates the change in cutting force, e.g., increases hardness, when compared to storing the food bar at a lower temperature. As an example, storing a food bar at 90° F. for 4 weeks affects the cutting force about as much as storing the food bar at 73° F. for about 3 months.

In some illustrative embodiments, a food bar may harden during storage and cause an increase in the cutting force. However, it is preferred that the cutting force of the food bar does not increase or does not substantially increase over a period of time so that the viable shelf life of the food bar can be extended. In some illustrative embodiments, a food bar according to the present disclosure is able to maintain the initial cutting force for about 4 months, about 6 months, about 9 months, or about one year at 73° F. As shown in some exemplary embodiments, the cutting force of the stored food bar is about the same or less than the initial cutting force of the food bar. In some embodiments, the cutting force of the food bar after storage for 4 or 6 weeks at 90° F. increases less than about 50%, less than about 30%, less than about 15%, less than about 10%, or less than about 5% of the initial cutting force. In some embodiments, the cutting force of the food bar after storage 6 months at 73° F.

increases less than about 50%, less than about 30%, less than about 15%, less than about 10%, or less than about 5% of the initial cutting force.

In some embodiments, the cutting force of the food bar after six months at 73° F. is less than about 20,000 N/kg, less than about 18,000 N/kg, or less than about 14,500 N/kg. In some embodiments, the food bar has an cutting force after six months at 73° F. of about 2,000 N/kg, about 2,500 N/kg, about 3,000 N/kg, about 3,500 N/kg, about 4,000 N/kg, about 4,500 N/kg, about 5,000 N/kg, about 5,500 N/kg, about 5,600 N/kg, about 5,700 N/kg, about 5,800 N/kg, about 5,900 N/kg, about 6,000 N/kg, about 6,100 N/kg, about 6,200 N/kg, about 6,300 N/kg, about 6,400 N/kg, about 6,500 N/kg, about 6,600 N/kg, about 6,700 N/kg, about 6,800 N/kg, about 6,900 N/kg, about 7,000 N/kg, about 7,100 N/kg, about 7,200 N/kg, about 7,300 N/kg, about 7,400 N/kg, about 7,500 N/kg, about 7,600 N/kg, about 7,700 N/kg, about 7,800 N/kg, about 7,900 N/kg, about 8,000 N/kg, about 8,100 N/kg, about 8,200 N/kg, about 8,300 N/kg, about 8,400 N/kg, about 8,500 N/kg, about 8,600 N/kg, about 8,700 N/kg, about 8,800 N/kg, about 8,900 N/kg, about 9,000 N/kg, about 9,100 N/kg, about 9,200 N/kg, about 9,300 N/kg, about 9,400 N/kg, about 9,500 N/kg, about 9,600 N/kg, about 9,700 N/kg, about 9,800 N/kg, about 9,900 N/kg, about 10,000 N/kg, about 10,200 N/kg, about 10,400 N/kg, about 10,600 N/kg, about 10,800 N/kg, about 11,000 N/kg, about 11,200 N/kg, about 11,400 N/kg, about 11,600 N/kg, about 11,800 N/kg, about 12,000 N/kg, about 12,200 N/kg, about 12,400 N/kg, about 12,600 N/kg, about 12,800 N/kg, about 13,000 N/kg, about 13,200 N/kg, about 13,400 N/kg, about 13,600 N/kg, about 13,800 N/kg, about 14,000 N/kg, about 14,200 N/kg, about 14,400 N/kg, about 14,600 N/kg, about 14,800 N/kg, about 15,000 N/kg, or about 15,500 N/kg. In some embodiments, the cutting force of the food bar after 6 months at 73° F. is in a range of about 5,000 N/kg to about 20,000 N/kg, about 5,000 N/kg to about 18,000 N/kg, or about 5,000 N/kg to about 16,000 N/kg.

A food bar in accordance with the present disclosure will have a particular compression force value. Compression force values indicate the amount of force a consumer uses to chew the food bar. In some embodiments, the compression force of the food bar is less than about 10,000 N/kg, less than about 8,000 N/kg, or less than about 6,000 N/kg. In some embodiments, the food bar has compression force of about 400 N/kg, about 500 N/kg, about 600 N/kg, about 700 N/kg, about 800 N/kg, about 900 N/kg, about 1,000 N/kg, about 1,100 N/kg, about 1,200 N/kg, about 1,300 N/kg, about 1,400 N/kg, about 1,500 N/kg, about 1,600 N/kg, about 1,700 N/kg, about 1,800 N/kg, about 1,900 N/kg, about 2,000 N/kg, about 2,100 N/kg, about 2,200 N/kg, about 2,300 N/kg, about 2,400 N/kg, about 2,500 N/kg, about 2,600 N/kg, about 2,700 N/kg, about 2,800 N/kg, about 2,900 N/kg, about 3,000 N/kg, about 3,100 N/kg, about 3,200 N/kg, about 3,300 N/kg, about 3,400 N/kg, about 3,500 N/kg, about 3,600 N/kg, about 3,700 N/kg, about 3,800 N/kg, about 3,900 N/kg, about 4,000 N/kg, about 4,100 N/kg, about 4,200 N/kg, about 4,300 N/kg, about 4,400 N/kg, about 4,500 N/kg, about 4,600 N/kg, about 4,700 N/kg, about 4,800 N/kg, about 4,900 N/kg, about 5,000 N/kg, about 5,500 N/kg, or about 6,000 N/kg. In some embodiments, the compression force of the food bar is in a range of about 400 N/kg to about 6,000 N/kg, about 1,000 N/kg to about 6,000 N/kg, about 1,000 N/kg to about 5,000 N/kg, or about 2,000 N/kg to about 5,000 N/kg. Illustratively, the listed compression force values may be initial compression force values or compression force values after a particular storage time. In some embodiments, the compression force values of the food bar after storage for 4 or 6 weeks at 90° F. increases less than about 50%, less than about 30%, less than about 15%, less than about 10%, or less than about 5% of the initial compression force. In some embodiments, the compression force of the food bar after storage 6 months at 73° F. increases less than about 50%, less than about 30%, less than about 15%, less than about 10%, or less than about 5% of the initial compression force.

A food bar in accordance with the present disclosure will have a particular water activity as defined as a measurement of bound water v. amount of water that is free to interact with surroundings. A lower water activity may provide antimicrobial properties and may increase shelf life of the food bar. Illustratively, if the water activity is below 0.6, microbial growth is minimized.

In some embodiments, the water activity of the food bar is less than about 0.7 or less than about 0.6. In some embodiments, the water activity of the food bar is about 0.4, about 0.42, about 0.44, about 0.46, about 0.48, about 0.5, about 0.51, about 0.52, about 0.53, about 0.54, about 0.55, about 0.56, about 0.57, about 0.58, about 0.59, about 0.6, about 0.62, about 0.64, about 0.66, about 0.68, about 0.7, about 0.8, about 1, about 1.2, about 1.4, about 1.6, about 1.8, or about 2. In some embodiments, the water activity of the food bar is in a range of about 0.4 to about 2, about 0.4 to about 1.4, about 0.4 to about 1, about 0.4 to about 0.7, about 0.4 to about 0.6, about 0.46 to about 0.6, or about 0.46 to about 0.58.

The color of the food bar can be measured by a colorimeter. In some exemplary embodiments, the color is measured as an L value, which ranges from 0 to 100, and where white measures as 100 and black measures as 0. Discoloration of the food bar can be measured over time. In some applications, it may be desirable for the food bar to have a minimal ΔL, where ΔL is the absolute value of the difference of the initial L value and the L value at a particular point in time.

In illustrative embodiments, the food bar has a ΔL of less than about 25, less than about 20, less than about 15, or less than about 10. In some embodiments, the food bar has a ΔL of about 2, about 3, about 4, about 5, about 6, about 7, about 8, about 9, about 10, about 11, about 12, about 13, about 14, about 15, about 17, about 20, or about 25. In some embodiments, the food bar has a ΔL in a range of about 2 to about 25, about 2 to about 15, about 2 to about 10, or about 2 to about 8. Illustratively, the duration for which the ΔL is measured can be at least about 2 months, at least about 4 months, or at least about 6 months. In some embodiments, the duration for which the ΔL is measured is about 3 months, about 4 months, about 5, months, about 6, months, about 7 months, about 8 months, about 9 months, or about 1 year.

In illustrative examples, a food bar according the present disclosure comprises a mixture of dry ingredients and a binder. Illustratively, both the mixture of dry ingredients and the binder are a certain weight percentage of the food bar.

In some illustrative embodiments, the mixture of dry ingredients is at least about 20%, at least about 30%, or at least about 40% by weight of the food bar. In some embodiments, the mixture of dry ingredients is about 30%, about 35%, about 40%, about 45%, about 50%, about 55%, about 60%, about 65%, about 70%, about 75%, or about 80% by weight of the food bar. In some embodiments, the mixture of dry ingredients is about 20% to about 80%, about 20% to about 70%, about 20% to about 60%, about 20% to about 50%, about 30% to about 70%, about 40% to about 70%, or about 45% to about 65% by weight of the food bar.

In some embodiments, the protein in the mixture of dry ingredients comprises a dairy-based protein, a vegetable-based protein, or a mixture thereof. Exemplary dairy-based proteins include Nutrilac 83% Protein and Nutrilac Milk Protein Blend (A), both available from Arla. Exemplary vegetable-based proteins include Canola Pro by DSM.

In some embodiments, the percentage of a protein in the food bar is at least about 5%, at least about 10%, or at least about 15% by weight of the food bar. In some embodiments, the percentage of a protein in the food bar is about 5%, about 10%, about 11%, about 12%, about 13%, about 14%, about 15%, about 16%, about 17%, about 18%, about 19%, about 20%, about 21%, about 22%, about 23%, about 24%, about 25%, about 30%, about 35%, or about 40% by weight of the food bar. In some embodiments, the percentage of a protein in the food bar is in a range of about 5% to about 40%, about 5% to about 30%, about 10% to about 30%, or about 10% to about 25% by weight of the food bar.

In some embodiments, the mixture of dry ingredients includes a fruit base. In some embodiments, the fruit base is a powder. Illustrative fruit bases include those formed from strawberries, watermelon, grapes, banana, peaches, mangos, pineapples, apples, cherries, oranges, grapefruits, mandarins, pomelos, clementines, blueberries, raspberries, pears, blackberries, plums, kiwis, melons, lemons, limes, tangerines, coconut, combinations thereof, or any suitable alternative. In some embodiments, the fruit base includes freeze-dried banana powder or freeze-dried strawberry powder, both of which are available from Van Drunen Farms.

In some embodiments, the percentage of a fruit base in the food bar is at least about 5%, at least about 10%, or at least about 15% by weight of the food bar. In some embodiments, the percentage of a fruit base in the food bar is about 5%, about 10%, about 11%, about 12%, about 13%, about 14%, about 15%, about 16%, about 17%, about 18%, about 19%, about 20%, about 21%, about 22%, about 23%, about 24%, about 25%, about 30%, about 35%, or about 40% by weight of the food bar. In some embodiments, the percentage of a fruit base in the food bar is in a range of about 5% to about 40%, about 5% to about 30%, about 10% to about 30%, or about 10% to about 25% by weight of the food bar.

In some embodiments, the mixture of dry ingredients includes a base. Illustrative bases include plant bases and dairy bases. Illustrative plant bases include a canola protein. In some embodiments, the plant base is DSM Canola Protein. Illustrative dairy bases include a yogurt or a milk. In some embodiments, the yogurt may be a yogurt powder. As an example, adding a yogurt to the food bar can provide the food bar with a taste similar to a yogurt-based smoothie. Exemplary yogurt powders include yogurt powder available from Grande. Additional dairy bases are available from DairiConcepts and Butter Buds.

In some embodiments, the percentage of a base in the food bar is at least about 5%, at least about 10%, or at least about 15% by weight of the food bar. In some embodiments, the percentage of a base in the food bar is about 5%, about 10%, about 11%, about 12%, about 13%, about 14%, about 15%, about 16%, about 17%, about 18%, about 19%, about 20%, about 21%, about 22%, about 23%, about 24%, about 25%, about 30%, about 35%, or about 40% by weight of the food bar. In some embodiments, the percentage of a base in the food bar is in a range of about 5% to about 40%, about 5% to about 30%, about 10% to about 30%, or about 10% to about 25% by weight of the food bar. It should be understood that the values provided for a base apply equally if the base is a plant base or a dairy base.

In some illustrative embodiments, the mixture of dry ingredients includes a colorant. Exemplary colorants include Fiesta Pink available from GNT, Exberry Shade Mandarin available from GNT and Exberry Shade Bordeaux available from GNT. In some embodiments, the percentage of a colorant in the food bar is at least about 0.05%, at least about 0.1%, or at least about 0.2% by weight of the food bar. In some embodiments, the percentage of a colorant in the food bar is about 0.05%, about 0.1%, about 0.2%, about 0.3%, about 0.4%, about 0.5%, about 0.6%, about 0.7%, about 0.8%, or about 1% by weight of the food bar. In some embodiments, the percentage of a colorant in the food bar is in a range of about 0.1% to about 1%, about 0.1% to about 0.7%, or about 0.2% to about 0.7% by weight of the food bar.

In some illustrative embodiments, the mixture of dry ingredients includes a flavoring. The flavorings may be chocolate or fruit. Illustrative fruit flavors include strawberry, banana, peach, mango, mixed berry, and mixtures thereof. Exemplary flavorings include Strawberry Bananas, available from IFF, Peach Mango available from IFF, and Mixed Berry available from IFF. In some embodiments, the percentage of a flavoring in the food bar is at least about 0.05%, at least about 0.1%, or at least about 0.2% by weight of the food bar. In some embodiments, the percentage of a flavoring in the food bar is about 0.05%, about 0.1%, about 0.2%, about 0.3%, about 0.4%, about 0.5%, about 0.6%, about 0.7%, about 0.8%, or about 1% by weight of the food bar. In some embodiments, the percentage of a flavoring in the food bar is in a range of about 0.1% to about 1%, about 0.1% to about 0.7%, or about 0.1% to about 0.5% by weight of the food bar.

In some illustrative embodiments, the mixture of dry ingredients includes produce fragments. Exemplary produce fragments include fruit fragments or vegetable fragments. Illustrative fruit fragments include those formed from strawberries, watermelon, grapes, banana, peaches, mangos, pineapples, apples, cherries, oranges, grapefruits, mandarins, pomelos, clementines, blueberries, raspberries, pears, blackberries, plums, kiwis, melons, lemons, limes, tangerines, coconut, combinations thereof, or any suitable alternative. Illustrative vegetable fragments include those formed from carrots, broccoli, peppers, cucumbers, corn, spinach, cauliflower, combinations thereof, or any suitable alternative. In some embodiments, a fruit fragment is a microdried fruit fragments. In some embodiments, the produce fragments comprise microdried strawberry fragments. Exemplary microdried strawberry fragments are available from Milne.

In some embodiments, the percentage of produce fragments in the food bar is at least about 5%, at least about 10%, or at least about 15% by weight of the food bar. In some embodiments, the percentage of produce fragments in the food bar is about 5%, about 10%, about 11%, about 12%, about 13%, about 14%, about 15%, about 16%, about 17%, about 18%, about 19%, about 20%, about 21%, about 22%, about 23%, about 24%, about 25%, about 30%, about 35%, or about 40% by weight of the food bar. In some embodiments, the percentage of produce fragments in the food bar is in a range of about 5% to about 40%, about 5% to about 30%, about 10% to about 30%, or about 10% to about 25% by weight of the food bar.

In illustrative embodiments, the binder comprises a sweetener and an acid. Illustratively, the combination of the sweetener and the acid may assist in minimizing discoloration during storage of the food bar.

In some illustrative embodiments, the binder is at least about 10%, at least about 14%, at least about 20%, or at least about 30% by weight of the food bar. In some embodiments, the binder is about 10%, about 15%, about 20%, about 25%, about 30%, about 35%, about 40%, about 45%, about 50%, about 55%, about 60%, about 65%, or about 70% by weight of the food bar. In some embodiments, the binder is about 10% to about 70%, about 10% to about 60%, about 15% to about 60%, about 20% to about 60%, about 20% to about 50%, or about 25% to about 50% by weight of the food bar.

In some embodiments, the sweetener comprises a syrup. Illustrative syrups include tapioca syrup and brown rice syrups. Exemplary tapioca syrups include Tapioca Syrup 42DE, available from Briess malt and Ingredients Co.

The sweetener used in the food bar may have a particular dextrose equivalence (DE). In some embodiments, the DE of the sweetener is at least about 20, at least about 30 or at least about 40 DE. In some embodiments, the DE of the sweetener is about 24. In some embodiments, the sweetener has a value of 42 DE. In some embodiments, the sweetener comprises a sweetener with about 20 to about 30 DE and a sweetener with about 35 to about 50 DE.

In some embodiments, the percentage of a sweetener in the food bar is at least about 5%, at least about 10%, or at least about 15% by weight of the food bar. In some embodiments, the percentage of sweetener in the food bar is less than about 50%, less than about 40%, or less than about 30% by weight of the food bar. In some embodiments, the percentage of a sweetener in the food bar is about 5%, about 10%, about 11%, about 12%, about 13%, about 14%, about 15%, about 16%, about 17%, about 18%, about 19%, about 20%, about 21%, about 22%, about 23%, about 24%, about 25%, about 30%, about 35%, or about 40% by weight of the food bar. In some embodiments, the percentage of a sweetener in the food bar is in a range of about 5% to about 40%, about 5% to about 30%, about 10% to about 30%, or about 10% to about 25% by weight of the food bar.

In some illustrative embodiments, the binder comprises an acid. Illustrative acids include citric acid, malic acid, lactic acid, acetic acid, tartaric acid, a weak organic acid, or a mixture thereof. In some embodiments, the acid is citric acid. In some illustrative embodiments, the citric acid is available from Cargill, Inc. In some embodiments, the percentage of an acid in the food bar is at least about 0.05%, at least about 0.1%, or at least about 0.2% by weight of the food bar. In some embodiments, the percentage of an acid in the food bar is about 0.05%, about 0.1%, about 0.2%, about 0.3%, about 0.4%, about 0.5%, about 0.6%, about 0.7%, about 0.8%, about 0.9%, or about 1% by weight of the food bar. In some embodiments, the percentage of an acid in the food bar is in a range of about 0.1% to about 1%, about 0.2% to about 0.7%, or about 0.3% to about 0.6% by weight of the food bar.

In some illustrative embodiments, the binder comprises a fat. Illustrative fats include coconut oil, palm oil, tallow, shea butter, cocoa butter, highly saturated fats, and mixtures and combinations thereof. In some embodiments, the fat comprises coconut oil. In some illustrative embodiments, the fat comprises coconut oil available from ADM.

In some embodiments, the percentage of a fat in the food bar is at least about 1%, at least about 2%, or at least about 3% by weight of the food bar. In some embodiments, the percentage of fat in the food bar is less than about 20%, less than about 15%, or less than about 10% by weight of the food bar. In some embodiments, the percentage of a fat in the food bar is about 1%, about 2%, about 3%, about 4%, about 4.5%, about 5%, about 6%, about 7%, about 8%, about 9%, about 10%, about 12%, about 15%, or about 20%, by weight of the food bar. In some embodiments, the percentage of a fat in the food bar is in a range of about 1% to about 20%, about 1% to about 15%, about 1% to about 10%, or about 2% to about 10% by weight of the food bar.

In some illustrative embodiments, the binder comprises a fruit concentrate. Illustrative fruit concentrates include juice concentrates, fruit pomaces, combinations thereof, or any suitable alternative. Illustrative fruit concentrates include concentrates of strawberries, watermelon, grapes, banana, peaches, mangos, pineapples, apples, cherries, oranges, grapefruits, mandarins, pomelos, clementines, blueberries, raspberries, pears, blackberries, plums, kiwis, melons, lemons, limes, tangerines, coconut, combinations thereof, or any suitable alternative. Illustrative fruit pomaces include pomaces formed from strawberries, watermelon, grapes, banana, peaches, mangos, pineapples, apples, cherries, oranges, grapefruits, mandarins, pomelos, clementines, blueberries, raspberries, pears, blackberries, plums, kiwis, melons, lemons, limes, tangerines, coconut, combinations thereof, or any suitable alternative. In some embodiments, the juice concentrate is apple juice concentrate. In some embodiments, the pomace is orange pomace. In some illustrative embodiments, the fruit concentrate comprises apple juice concentrate provided by Shaanxi Sanchuan Juice Co., LTD. In some illustrative embodiments, the fruit concentrate comprises orange pomace, which is a proprietary ingredient from PepsiCo.

In some embodiments, the percentage of a fruit concentrate in the food bar is at least about 2%, at least about 3%, at least about 5%, or at least about 7% by weight of the food bar. In some embodiments, the percentage of fruit concentrate in the food bar is less than about 30%, less than about 25%, or less than about 15% by weight of the food bar. In some embodiments, the percentage of a fruit concentrate in the food bar is about 3%, about 4%, about 5%, about 6%, about 7%, about 8%, about 9%, about 10%, about 11%, about 12%, about 13%, about 14%, about 15%, about 16%, about 17%, about 18%, about 20%, about 22%, about 25%, or about 30% by weight of the food bar. In some embodiments, the percentage of a fruit concentrate in the food bar is in a range of about 3% to about 30%, about 3% to about 20%, about 5% to about 20%, or about 5% to about 15% by weight of the food bar.

In some illustrative embodiments, the binder comprises a water-activity modulator. In some embodiments, the water-activity modulator comprises glycerin, a soluble fiber, or a mixture thereof. In some embodiments, the water-activity modulator comprises glycerin. In some illustrative embodiments, the water-activity modulator comprises glycerin available from Harris and Ford (PG). In some embodiments, the soluble fiber comprises a fructan. In some embodiments, the fructan comprises inulin.

In some embodiments, the percentage of a water-activity modulator is at least 2% by weight of the food bar. In some embodiments, the percentage of a water-activity modulator in the food bar is at least about 3%, at least about 5%, or at least about 7% by weight of the food bar. In some embodiments, the percentage of a water-activity modulator in the food bar is less than about 30%, less than about 25%, or less than about 15% by weight of the food bar. In some embodiments, the percentage of a water-activity modulator in the food bar is about 3%, about 4%, about 5%, about 6%, about 7%, about 8%, about 9%, about 10%, about 11%, about 12%, about 13%, about 14%, about 15%, about 16%, about 17%, about 18%, about 20%, about 22%, about 25%, or about 30% by weight of the food bar. In some embodiments, the percentage of a water-activity modulator in the food bar is in a range of about 3% to about 30%, about 3% to about 20%, about 5% to about 20%, or about 5% to about 15% by weight of the food bar.

Illustratively, if the food bar comprises a sweetener and a fruit concentrate, the two components are present at particular ratio, sometimes called a sugar ratio.

Illustratively, the ratio is a ratio of the weight percent of each component in the formulation. In some examples, the ratio of fruit concentrate to sweetener contributes to maintaining the color of the food bar and to minimize browning. In some illustrative embodiments, the ratio of the weight percent of fruit concentrate to the weight percent of sweetener is at least about 0.3, at least about 0.4, at least about 0.6, or at least about 0.8. In some embodiments, the ratio of the weight percent of fruit concentrate to the weight percent of sweetener is less than about 1.2, less than about 1, or less than about 0.8. In some embodiments, the ratio of the weight percent of fruit concentrate to the weight percent of sweetener is about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, or about 2. In some embodiments, the ratio of the weight percent of fruit concentrate to the weight percent of sweetener is in a first set of ranges of about 0.3 to about 2, about 0.4 to about 2, about 0.4 to about 1.7, or about 0.4 to about 1.6, about 0.7 to about 1.6, about 0.8 to about 1.6, about 0.8 to about 1.5, or about 0.8 to about 1.4. In some embodiments, the ratio of the weight percent of fruit concentrate to the weight percent of sweetener is in a second set of ranges of about 0.3 to about 1.8, about 0.3 to about 1, about 0.4 to about 1, or about 0.4 to about 0.8, or about 0.4 to about 0.6.

In illustrative embodiments, exemplary formed food bars and components are analyzed using a multivariate regression. As described using some examples below, data, such as cutting force, L value, and water activity, can be fit using a multivariate regression model to optimize for Individual Desirability and Composite Desirability. For Individual Desirability, the closer the predicted responses are to the target requirements, the closer the desirability will be to 1. As an example, a target for the L value would be to maximize the value and a target for cutting force would be to minimize the value.

Illustratively, each Individual Desirability is combined into an overall value to form a Composite Desirability. In some embodiments, the Composite Desirability is at least 0.5, at least 0.6, or at least 0.7. In some embodiments, the Composite Desirability is about 0.5, about 0.6, about 0.7, about 0.75, about 0.8, about 0.85, about 0.9, or about 0.95. In some embodiments, the Composite Desirability is in a range of about 0.5 to about 0.95, about 0.6 to about 0.9, or about 0.7 to about 0.9.

A method for forming a food bar according to the present disclosure may include a step of combining the dry ingredients to form a mixture of dry ingredients. In some embodiments, the method includes a step of forming the binder by combining the ingredients for the binder. In some illustrative embodiments, the method includes a step of combining the dry ingredients and the binder to form a blended composition. In some embodiments, the method includes a step of pressing the blended composition. In some embodiments, the method includes a step of cutting the pressed composition to form food bars.

In some illustrative embodiments, the step of combining the mixture of dry ingredients includes blending the dry ingredients in a mixer.

In some illustrative embodiments, the step of forming the binder includes blending the ingredients in a mixer. In some embodiments, the step of forming the binder includes a step of heating a sweetener, a fat, or a mixture thereof. In some embodiments, the step of heating is performed at least about 100° F. In some embodiments, the step of heating is performed at about 125° F. In some exemplary embodiments, the remaining components of the binder are added to the sweetener, fat, or mixture thereof after heating.

In some illustrative embodiments, the mixture of dry ingredients and the binder are combined. Illustratively, the mixture of dry ingredients and the binder can be combined via blending in a mixer.

After combining the mixture of dry ingredients and the binder, the combined composition can be pressed into a bar. In some embodiments, the combined ingredients are cold-pressed into a bar. In some illustrative embodiments, the mixture of dry ingredients, the binder, or the combination thereof are not extruded.

EXAMPLES

Example 1

Food Bar

A formulation for a food bar was prepared by mixing a fruit base, a protein, a yogurt, and a sweetener. The fruit base was Freeze Dried Powder-Strawberry, available from Van Drunen Farms. The protein was Arla Nutrilac 83%, available from Arla Foods Ingredients. The binder was Tapioca Syrup 42DE, available from Briess Malt and Ingredients Co. The yogurt was Yogurt Powder, available from Grande. The approximate weight percentages of the components relative to the overall formulation were as follows:

TABLE 1

| Ingredient | Wt. % |
| --- | --- |
| Freeze Dried Fruit Powder-Strawberry | 20% |
| Arla Nutrilac 83% Protein | 20% |
| Tapioca Syrup 42DE | 50% |
| Yogurt Powder | 10% |

The components were combined via mixing in a Kitchen Aid mixer or for larger scale in a ribbon blender. The resulting composition was cold-pressed into bars.

Example 2

Food Bar

A formulation for a food bar was prepared by mixing dry ingredients with a binder.

The mixture of dry ingredients included a fruit base, a yogurt, a protein, a flavoring, and a colorant. The fruit base was Freeze-Dried Banana Powder available from Van Drunen Farms. The yogurt was Yogurt Powder, available from Grande. The protein was Nutrilac Milk Protein Blend (A), available from Arla Foods Ingredients. The flavoring was Strawberry Bananas, available from IFF. The colorant was Fiesta Pink, available from GNT. The approximate weight percentages of the components relative to the overall formulation were as follows:

TABLE 2

| Ingredient | Wt. % |
| --- | --- |
| Freeze-Dried Banana Powder | 18% |
| Yogurt Powder | 16.6% |

TABLE 2-continued

| Ingredient | Wt. % |
| --- | --- |
| Nutrilac Milk Protein Blend (A) | 18.3% |
| Strawberry Banana | 0.3% |
| Fiesta Pink | 0.5% |

The components were combined via blending in a mixer.

The binder included a sweetener, a fat, a fruit concentrate, an acid, and a water-activity modulator. The sweetener was Tapioca Syrup 42DE, available from Briess Malt and Ingredients Co. The fat was Coconut Oil, available from ADM. The fruit concentrate was Apple Juice Concentrate, available from Shaanxi Sanchuan Juice Co., LTD. The acid was citric acid, available from Cargill, Inc. The water-activity modulator was glycerin, available from Harris and Ford (PG). The approximate weight percentages of the components relative to the overall formulation were as follows:

TABLE 3

| Ingredient | Wt. % |
| --- | --- |
| Tapioca Syrup 42DE | 21 |
| Coconut Oil | 4.5% |
| Apple Juice Concentrate | 10.6% |
| Citric Acid | 0.9% |
| Glycerin | 10% |

The tapioca syrup and the coconut oil were combined and heated to 125° C. Once the mixture cooled to room temperature, the apple juice concentrate, the citric acid, and the glycerin were added to form the binder. The binder was combined with the mixture of dry ingredients and combined via blending in a ribbon blender. The resulting composition was cold-pressed into bars.

The resulting sugar ratio of fruit concentrate:sweetener in the bar was about 0.5.

Example 3

Food Bar

A formulation for a food bar was prepared by mixing the following dry ingredients with a binder.

The mixture of dry ingredients included a fruit base, a yogurt, a protein, a flavor, and a colorant. The fruit base was Freeze-Dried Banana Powder available from Van Drunen Farms. The yogurt was Yogurt Powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 4

| Ingredient | Wt. % |
| --- | --- |
| Freeze-Dried Banana Powder | 20% |
| Yogurt Powder | 18.9% |
| Nutrilac Milk Protein Blend (A) | 19.3% |
| Strawberry Banana | 0.3% |
| Fiesta Pink | 0.5% |

The components were combined via blending in a mixer.

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was orange pomace, a proprietary ingredient from PepsiCo. The acid was citric acid, available from Cargill. The glycerin was humectant, available from Harris and Ford (PG). The approximate weight percentages of the components relative to the overall formulation were as follows:

TABLE 5

| Ingredient | Wt. % |
| --- | --- |
| Tapioca Syrup 42DE | 17.6% |
| Coconut Oil | 4.5% |
| Orange Pomace | 8.6% |
| Citric Acid | 0.4% |
| Glycerin | 10% |

The tapioca syrup and the coconut oil were combined and heated to 125° C. The orange pomace, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.4.

Example 4

Food Bar

A formulation for a food bar was prepared by mixing the following dry ingredient blend with a binder.

The dry ingredient blend included a fruit base, a yogurt, a protein, a flavoring, a colorant, and produce fragments. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The produce fragments were microdried strawberry fragments, available from Milne. The approximate weight percentages of the components relative to the overall formulation were as follows:

TABLE 6

| Ingredient | Wt. % |
| --- | --- |
| Freeze-Dried Banana Powder | 14% |
| Yogurt Powder | 16.1% |
| Nutrilac Milk Protein Blend (A) | 18.2% |
| Strawberry Banana | 0.3% |
| Fiesta Pink | 15% |
| Microdried Strawberry Fragments | 14% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was orange pomace, available from PepsiCo. The acid was citric acid, available from Cargill. The glycerin was a humectant, available from Harris and Ford (PG). The approximate weight percentages of the components relative to the overall formulation were as follows:

TABLE 7

| Ingredient | Wt. % |
| --- | --- |
| Tapioca Syrup 42DE | 16.6% |
| Coconut Oil | 4.5% |
| Orange Pomace | 8.6% |
| Citric Acid | 0.3% |
| Glycerin | 10% |

The tapioca syrup and the coconut oil were combined and heated to 125° C. The orange pomace, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.5.

Example 5

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 8

| Ingredient | Wt. % |
| --- | --- |
| Freeze-Dried Banana Powder | 18% |
| Yogurt Powder | 16.6% |
| Nutrilac Milk Protein Blend (A) | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 28DE, available from Briess Malt and Ingredients Co. The fat was coconut oil, available from ADM. The fruit concentrate was apple juice concentrate, available from Shaanxi Sanchuan Juice Co., LTD. The glycerin was a humectant, available from Harris and Ford (PG). The approximate weight percentages of the components relative to the overall formulation were as follows:

TABLE 9

| Ingredient | Wt. % |
| --- | --- |
| Tapioca Syrup 28DE | 22.8% |
| Coconut Oil | 4% |
| Apple Juice Concentrate | 9.5% |
| Glycerin | 10% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.42.

The formed bars were stored at 73° F. or 90° F. for up to six weeks. Water activity (Aw), color (L value), pH, compression force, and cutting force were measured at 0, 2, 4, and 6 weeks. The results are shown below in Table 10 (73° F.) and Table 11 (90° F.).

TABLE 10

| Week | Aw | L value | pH | Compression force (N/kg) | Cutting force (N/kg) |
| --- | --- | --- | --- | --- | --- |
| 0 | 0.53 | 33.4 | 5.2 | 2860 | 6979 |
| 2 | 0.57 | 31.7 | NA | 2304 | 6192 |
| 4 | 0.51 | 41.7 | NA | 2777 | 5264 |
| 6 | 0.53 | 43.1 | 5.5 | 5861 | 8463 |

TABLE 11

| Week | Aw | L value | pH | Compression force (N/kg) | Cutting force (N/kg) |
| --- | --- | --- | --- | --- | --- |
| 0 | 0.53 | 33.4 | 5.2 | 2860 | 6979 |
| 2 | 0.60 | 31.8 | NA | 3020 | 4650 |
| 4 | 0.56 | 35.9 | NA | 2536 | 4148 |
| 6 | 0.54 | 34.2 | 5.3 | 2101 | 5204 |

Example 6

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein (B), available from DSM. The flavoring was Strawberry Banana, available from IFF. The colorant was Fiesta Pink, available from GNT. The approximate weight percentages of the components relative to the overall formulation were as follows:

TABLE 12

| Ingredient | Wt. % |
| --- | --- |
| Freeze-Dried Banana Powder | 18% |
| Yogurt Powder | 16.6% |
| DSM Canola Protein (B) | 18.3% |
| Strawberry Banana | 0.3% |
| Fiesta Pink | 0.5% |

The binder included a sweetener, a fat, and a fruit concentrate. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The approximate weight percentages of the components relative to the overall formulation were as follows:

TABLE 13

| Ingredient | Wt. % |
| --- | --- |
| Tapioca Syrup 42DE | 27.8% |
| Coconut Oil | 4% |
| Apple Juice Concentrate | 14.5% |

The tapioca syrup and the coconut oil were combined and heated to 125° C. The apple juice concentrate was added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.52.

The formed bars were stored at 73° F. or 90° F. for up to six weeks. Water activity (Aw), color (L value), pH, compression force, and cutting were measured at 0, 2, 4, and 6 weeks. The results are shown below in Table 14 (73° F.) and Table 15 (90° F.).

TABLE 14

| Week | Aw | L value | pH | Compression force (N/kg) | Cutting force (N/kg) |
|---|---|---|---|---|---|
| 0 | 0.56 | 28.1 | 4.7 | 3210 | 5808 |
| 2 | 0.60 | 32.4 | NA | 1844 | 6089 |
| 4 | 0.59 | 31.4 | NA | 5338 | 9771 |
| 6 | 0.57 | 31.8 | 4.9 | 7559 | 8177 |

TABLE 15

| Week | Aw | L value | pH | Compression force (N/kg) | Cutting force (N/kg) |
|---|---|---|---|---|---|
| 0 | 0.56 | 28.1 | 4.7 | 3210 | 5808 |
| 2 | 0.60 | 30.5 | NA | 3207 | 8207 |
| 4 | 0.60 | 28.1 | NA | 2942 | 5710 |
| 6 | 0.57 | 27.2 | 4.7 | 5546 | 6536 |

Example 7

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein (B), available from DSM. The flavoring was Strawberry Banana, available from IFF. The colorant was Fiesta Pink, available from GNT. The approximate weight percentages of the components relative to the overall formulation were as follows:

TABLE 16

| Ingredient | Wt. % |
|---|---|
| Freeze-Dried Banana Powder | 18% |
| Yogurt Powder | 16.6% |
| DSM Canola Protein (B) | 18.4% |
| Strawberry Banana | 0.3% |
| Fiesta Pink | 0.5% |

The binder included a sweetener, a fat, a fruit concentrate, and a water-activity modulator. The sweetener was Tapioca Syrup 28DE, available from Briess Malt and Ingredients Co. The fat was coconut oil, available from ADM. The fruit concentrate was apple juice concentrate, available from Shaanxi Sanchuan Juice Co., LTD. The glycerin was a humectant, available from Harris and Ford (PG). The approximate weight percentages of the components relative to the overall formulation were as follows:

TABLE 17

| Ingredient | Wt. % |
|---|---|
| Tapioca Syrup 28DE | 9.5% |
| Coconut Oil | 4% |
| Apple Juice Concentrate | 22.8% |
| Glycerin | 10% |

The tapioca syrup and the coconut oil were combined and heated to 125° C. The apple juice concentrate and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 2.4.

The formed bars were stored at 73° F. or 90° F. for up to six weeks. Water activity (Aw), color (L value), pH, compression force, and cutting force were measured at 0, 2, 4, and 6 weeks. The results are shown below in Table 18 (73° F.) and Table 19 (90° F.).

TABLE 18

| Week | Aw | L value | pH | Compression force (N/kg) | Cutting force (N/kg) |
|---|---|---|---|---|---|
| 0 | 0.52 | 29.8 | 4.8 | 625 | 838 |
| 2 | 0.56 | 31.6 | NA | 439 | 1143 |
| 4 | 0.57 | 30.3 | NA | 608 | 1232 |
| 6 | 0.55 | 30.1 | 4.8 | 1460 | 1395 |

TABLE 19

| Week | Aw | L value | pH | Compression force (N/kg) | Cutting force (N/kg) |
|---|---|---|---|---|---|
| 0 | 0.52 | 29.8 | 4.8 | 625 | 838 |
| 2 | 0.55 | 29.6 | NA | 659 | 1263 |
| 4 | 0.58 | 27.4 | NA | 413 | 1030 |
| 6 | 0.55 | 25.3 | 4.7 | 1254 | 1216 |

Example 8

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein (B), available from DSM. The flavoring was Strawberry Banana, available from IFF. The colorant was Fiesta Pink, available from GNT. The approximate weight percentages of the components relative to the overall formulation were as follows:

TABLE 20

| Ingredient | Wt. % |
|---|---|
| Freeze-Dried Banana Powder | 18% |
| Yogurt Powder | 16.6% |
| DSM Canola Protein (B) | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 21

| Ingredient | Wt. % |
| --- | --- |
| Tapioca Syrup 42DE | 22.5% |
| Coconut Oil | 4% |
| Apple Juice Concentrate | 9.2% |
| Citric Acid | 0.6% |
| Glycerin | 10% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.4.

The formed bars were stored at 73° F. or 90° F. for up to six weeks. Water activity (Aw), color (L value), pH, compression force, and cutting force were measured at 0, 2, 4, and 6 weeks. The results are shown below in Table 22 (73° F.) and Table 23 (90° F.).

TABLE 22

| Week | Aw | L value | pH | Compression force (N/kg) | Cutting force (N/kg) |
| --- | --- | --- | --- | --- | --- |
| 0 | 0.52 | 29.2 | 4.5 | 1171 | 1762 |
| 2 | 0.54 | 33.0 | NA | 530 | 1566 |
| 4 | 0.55 | 32.3 | NA | 1029 | 2227 |
| 6 | 0.52 | 31.6 | 4.5 | 1947 | 1787 |

TABLE 23

| Week | Aw | L value | pH | Compression force (N/kg) | Cutting force (N/kg) |
| --- | --- | --- | --- | --- | --- |
| 0 | 0.52 | 29.2 | 4.5 | 1171 | 1762 |
| 2 | 0.53 | 30.5 | NA | 454 | 1816 |
| 4 | 0.57 | 28.8 | NA | 696 | 1638 |
| 6 | 0.54 | 28.0 | 4.4 | 1919 | 2460 |

Example 9

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 24

| Ingredient | Wt. % |
| --- | --- |
| Freeze-Dried Banana Powder | 18% |
| Yogurt Powder | 16.6% |
| Nutrilac Milk Protein Blend (A) | 18.3% |
| Strawberry Banana | 0.3% |
| Fiesta Pink | 0.5% |

The binder included a sweetener, a fat, a fruit concentrate, and an acid. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The approximate weight percentages of the components relative to the overall formulation were as follows:

TABLE 25

| Ingredient | Wt. % |
| --- | --- |
| Tapioca Syrup 42DE | 14.2% |
| Coconut Oil | 4% |
| Apple Juice Concentrate | 27.5% |
| Citric Acid | 0.6% |

The tapioca syrup and the coconut oil were combined and heated to 125° C. The apple juice concentrate and the citric acid were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 1.9.

The formed bars were stored at 73° F. or 90° F. for up to six weeks. Water activity (Aw), color (L value), pH, compression force, and cutting force were measured at 0, 2, 4, and 6 weeks. The results are shown below in Table 26 (73° F.) and Table 27 (90° F.).

TABLE 26

| Week | Aw | L value | pH | Compression force (N/kg) | Cutting force (N/kg) |
| --- | --- | --- | --- | --- | --- |
| 0 | 0.60 | 34.1 | 4.6 | 3465 | 6771 |
| 2 | 0.61 | 32.8 | NA | 4562 | 7494 |
| 4 | 0.60 | 42.8 | NA | 1309 | 7002 |
| 6 | 0.59 | 41.3 | 4.8 | 4870 | 7709 |

TABLE 27

| Week | Aw | L value | pH | Compression force (N/kg) | Cutting force (N/kg) |
| --- | --- | --- | --- | --- | --- |
| 0 | 0.60 | 34.1 | 4.6 | 3465 | 6771 |
| 2 | 0.63 | 28.6 | NA | 3784 | 8094 |
| 4 | 0.62 | 34.2 | NA | 3394 | 7480 |
| 6 | 0.60 | 31.0 | 4.7 | 5271 | 8023 |

Example 10

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein (B), available from DSM. The flavoring was Strawberry Banana, available from IFF. The colorant was Fiesta Pink, available from GNT. The approximate weight percentages of the components relative to the overall formulation were as follows:

TABLE 28

| Ingredient | Wt. % |
| --- | --- |
| Freeze-Dried Banana Powder | 18% |
| Yogurt Powder | 16.6% |
| DSM Canola Protein (B) | 18.3% |
| Strawberry Banana | 0.3% |
| Fiesta Pink | 0.5% |

The binder included a sweetener, a fat, a fruit concentrate, and an acid. The sweetener was Tapioca Syrup 28DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The approximate weight percentages of the components relative to the overall formulation were as follows:

TABLE 29

| Ingredient | Wt. % |
| --- | --- |
| Tapioca Syrup 28DE | 14.2% |
| Coconut Oil | 4% |
| Apple Juice Concentrate | 27.5% |
| Citric Acid | 0.6% |

The tapioca syrup and the coconut oil were combined and heated to 125° C. The apple juice concentrate and the citric acid were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 1.9.

The formed bars were stored at 73° F. or 90° F. for up to six weeks. Water activity (Aw), color (L value), pH, compression force, and cutting force were measured at 0, 2, 4, and 6 weeks. The results are shown below in Table 30 (73° F.) and Table 31 (90° F.).

TABLE 30

| Week | Aw | L value | pH | Compression force (N/kg) | Cutting force (N/kg) |
| --- | --- | --- | --- | --- | --- |
| 0 | 0.56 | 29.0 | 4.5 | 2653 | 4207 |
| 2 | 0.62 | 31.8 | NA | 1298 | 3046 |
| 4 | 0.60 | 31.6 | NA | 1489 | 3386 |
| 6 | 0.56 | 31.1 | 4.5 | 3578 | 3253 |

TABLE 31

| Week | Aw | L value | pH | Compression force (N/kg) | Cutting force (N/kg) |
| --- | --- | --- | --- | --- | --- |
| 0 | 0.56 | 29.0 | 4.5 | 2653 | 4207 |
| 2 | 0.60 | 29.7 | NA | 1229 | 3222 |
| 4 | 0.61 | 27.7 | NA | 1320 | 2818 |
| 6 | 0.60 | 27.0 | 4.3 | 2578 | 3155 |

Example 11

Food Bar

A formulation for a food bar was prepared by mixing the following dry ingredient blend with a binder.

The dry ingredient blend included a fruit base, a yogurt, a protein, a flavoring, a colorant, and produce fragments. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 32

| Ingredient | Wt. % |
| --- | --- |
| Freeze-Dried Banana Powder | 18% |
| Yogurt Powder | 16.6% |
| Nutrilac Milk Protein Blend (A) | 18.3% |
| Strawberry Banana | 0.3% |
| Fiesta Pink | 0.5% |

The binder included a sweetener, a fat, and a fruit concentrate. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The approximate weight percentages of the components relative to the overall formulation were as follows:

TABLE 33

| Ingredient | Wt. % |
| --- | --- |
| Tapioca Syrup 42DE | 14% |
| Coconut Oil | 4% |
| Apple Juice Concentrate | 28% |

The tapioca syrup and the coconut oil were combined and heated to 125° C. The apple juice concentrate was added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 2.

The formed bars were stored at 73° F. or 90° F. for up to six weeks. Water activity (Aw), color (L value), pH, compression force, and cutting force were measured at 0, 2, 4, and 6 weeks. The results are shown below in Table 34 (73° F.) and Table 35 (90° F.).

TABLE 34

| Week | Aw | L value | pH | Compression force (N/kg) | Cutting force (N/kg) |
|---|---|---|---|---|---|
| 0 | 0.58 | 33.4 | 5.4 | 4961 | 5935 |
| 2 | 0.62 | 41.6 | NA | 3433 | 4972 |
| 4 | 0.56 | 41.1 | NA | 1763 | 5681 |
| 6 | 0.56 | 40.0 | 5.2 | 2363 | 5637 |

TABLE 35

| Week | Aw | L value | pH | Compression force (N/kg) | Cutting force (N/kg) |
|---|---|---|---|---|---|
| 0 | 0.58 | 33.4 | 5.4 | 4961 | 5935 |
| 2 | 0.65 | 38.3 | NA | 3402 | 4211 |
| 4 | 0.57 | 33.0 | NA | 3255 | 6762 |
| 6 | 0.59 | 31.5 | 5.1 | 3092 | 7261 |

Example 12

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 36

| Ingredient | Wt. % |
|---|---|
| Freeze-Dried Banana Powder | 18% |
| Yogurt Powder | 16.6% |
| Milk protein | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 37

| Ingredient | Wt. % |
|---|---|
| Tapioca Syrup 42DE | 10.5% |
| Coconut Oil | 4% |
| Apple Juice Concentrate | 21.2% |
| Citric Acid | 0.6% |
| Glycerin | 10% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 2.

The formed bars were stored at 73° F. or 90° F. for up to six weeks. Water activity (Aw), color (L value), pH, compression force, and cutting force were measured at 0, 2, 4, and 6 weeks. The results are shown below in Table 38 (73° F.) and Table 39 (90° F.).

TABLE 38

| Week | Aw | L value | pH | Compression force (N/kg) | Cutting force (N/kg) |
|---|---|---|---|---|---|
| 0 | 0.52 | 31.0 | 4.4 | 564 | 916 |
| 2 | 0.53 | 31.5 | NA | 515 | 1223 |
| 4 | 0.57 | 15.9 | NA | 485 | 1191 |
| 6 | 0.52 | 30.8 | 4.5 | 1258 | 1422 |

TABLE 39

| Week | Aw | L value | pH | Compression force (N/kg) | Cutting force (N/kg) |
|---|---|---|---|---|---|
| 0 | 0.52 | 31.0 | 4.4 | 564 | 916 |
| 2 | 0.53 | 28.9 | NA | 530 | 1334 |
| 4 | 0.56 | 26.9 | NA | 469 | 1131 |
| 6 | 0.56 | 25.5 | 4.4 | 1330 | 1555 |

Example 13

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 40

| Ingredient | Wt. % |
|---|---|
| Freeze-Dried Banana Powder | 18% |
| Yogurt Powder | 16.6% |
| Nutrilac Milk Protein Blend (A) | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 28DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 41

| Ingredient | Wt. % |
|---|---|
| Tapioca Syrup 28DE | 21.1% |
| Coconut Oil | 4% |
| Apple Juice Concentrate | 10.6% |
| Citric Acid | 0.6% |
| Glycerin | 10% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.5.

The formed bars were stored at 73° F. or 90° F. for up to six weeks. Water activity (Aw), color (L value), pH, compression force, and cutting force were measured at 0, 2, 4, and 6 weeks. The results are shown below in Table 42 (73° F.) and Table 43 (90° F.).

TABLE 42

| Week | Aw | L value | pH | Compression force (N/kg) | Cutting force (N/kg) |
|---|---|---|---|---|---|
| 0 | 0.54 | 34.9 | 5.1 | 2377 | 7885 |
| 2 | 0.59 | 42.6 | NA | 2876 | 5769 |
| 4 | 0.52 | 43.0 | NA | 2514 | 7260 |
| 6 | 0.54 | 43.2 | 5.0 | 3167 | 7644 |

TABLE 43

| Week | Aw | L value | pH | Compression force (N/kg) | Cutting force (N/kg) |
|---|---|---|---|---|---|
| 0 | 0.54 | 34.9 | 5.1 | 2377 | 7885 |
| 2 | 0.62 | 39.9 | NA | 2525 | 3773 |
| 4 | 0.53 | 36.8 | NA | 1520 | 4864 |
| 6 | 0.54 | 36.4 | 4.8 | 2270 | 5305 |

Example 14

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 44

| Ingredient | Wt. % |
|---|---|
| Freeze-Dried Banana Powder | 18% |
| Yogurt Powder | 16.6% |
| Nutrilac Milk Protein Blend (A) | 18.3% |

TABLE 44-continued

| Ingredient | Wt. % |
|---|---|
| Strawberry Banana | 0.3% |
| Fiesta Pink | 0.5% |

The binder included a sweetener, a fat, and a fruit concentrate. The sweetener was Tapioca Syrup 28DE, available from Briess Malt and Ingredients Co. The fat was coconut oil, available from ADM. The fruit concentrate was apple juice concentrate, available from Shaanxi Sanchuan Juice Co., LTD. The approximate weight percentages of the components relative to the overall formulation were as follows:

TABLE 45

| Ingredient | Wt. % |
|---|---|
| Tapioca Syrup 28DE | 14.5% |
| Coconut Oil | 4% |
| Apple Juice Concentrate | 27.8% |

The tapioca syrup and the coconut oil were combined and heated to 125° C. The apple juice concentrate was added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 1.9.

The formed bars were stored at 73° F. or 90° F. for up to six weeks. Water activity (Aw), color (L value), pH, compression force, and cutting force were measured at 0, 2, 4, and 6 weeks. The results are shown below in Table 46 (73° F.) and Table 47 (90° F.).

TABLE 46

| Week | Aw | L value | pH | Compression force (N/kg) | Cutting force (N/kg) |
|---|---|---|---|---|---|
| 0 | 0.58 | 33.2 | 5.5 | 5292 | 8687 |
| 2 | 0.62 | 41.7 | NA | 4513 | 7085 |
| 4 | 0.57 | 40.6 | NA | 3667 | 6847 |
| 6 | 0.61 | 40.1 | 5.3 | 2996 | 7325 |

TABLE 47

| Week | Aw | L value | pH | Compression force (N/kg) | Cutting force (N/kg) |
|---|---|---|---|---|---|
| 0 | 0.58 | 33.2 | 5.5 | 5292 | 8687 |
| 2 | 0.65 | 38.3 | NA | 5219 | 5716 |
| 4 | 0.58 | 33.3 | NA | 2286 | 6831 |
| 6 | 0.61 | 31.3 | 5.1 | 4479 | 8333 |

Example 15

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 48

| Ingredient | Wt. % |
|---|---|
| Freeze-Dried Banana Powder | 18% |
| Yogurt Powder | 16.6% |
| Nutrilac Milk Protein Blend (A) | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 49

| Ingredient | Wt. % |
|---|---|
| Tapioca Syrup 42DE | 22.5% |
| Coconut Oil | 4% |
| Apple Juice Concentrate | 9.2% |
| Citric Acid | 0.6% |
| Glycerin | 10% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.4.

The formed bars were stored at 73° F. or 90° F. for up to six weeks. Water activity (Aw), color (L value), pH, compression force, and cutting force were measured at 0, 2, 4, and 6 weeks. The results are shown below in Table 50 (73° F.) and Table 51 (90° F.)

TABLE 50

| Week | Aw | L value | pH | Compression force (N/kg) | Cutting force (N/kg) |
|---|---|---|---|---|---|
| 0 | 0.50 | 34.8 | 5.0 | 4111 | 10743 |
| 2 | 0.59 | 41.9 | NA | 3123 | 4514 |
| 4 | 0.52 | 41.6 | NA | 2445 | 4775 |
| 6 | 0.54 | 40.8 | 4.9 | 2171 | 5112 |

TABLE 51

| Week | Aw | L value | pH | Compression force (N/kg) | Cutting force (N/kg) |
|---|---|---|---|---|---|
| 0 | 0.50 | 34.8 | 5.0 | 4111 | 10743 |
| 2 | 0.62 | 39.8 | NA | 1850 | 3516 |
| 4 | 0.56 | 36.4 | NA | 2475 | 7433 |
| 6 | 0.54 | 33.6 | 4.8 | 3060 | 6738 |

Example 16

Food Bar

A formulation for a food bar was prepared by mixing the following dry ingredient blend with a binder.

The dry ingredient blend included a fruit base, a yogurt, a protein, a flavoring, a colorant, and produce fragments. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 52

| Ingredient | Wt. % |
|---|---|
| Freeze-Dried Banana Powder | 18% |
| Yogurt Powder | 16.6% |
| DSM Canola Protein (B) | 18.3% |
| Strawberry Banana | 0.3% |
| Fiesta Pink | 0.5% |

The binder included a sweetener, a fat, a fruit concentrate, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The approximate weight percentages of the components relative to the overall formulation were as follows:

TABLE 53

| Ingredient | Wt. % |
|---|---|
| Tapioca Syrup 42DE | 9.5% |
| Coconut Oil | 4% |
| Apple Juice Concentrate | 22.8% |
| Glycerin | 10% |

The tapioca syrup and the coconut oil were combined and heated to 125° C. The apple juice concentrate and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 2.4.

The formed bars were stored at 73° F. or 90° F. for up to six weeks. Water activity (Aw), color (L value), pH, compression force, and cutting force were measured at 0, 2, 4, and 6 weeks. The results are shown below in Table 54 (73° F.) and Table 55 (90° F.).

TABLE 54

| Week | Aw | L value | pH | Compression force (N/kg) | Cutting force (N/kg) |
|---|---|---|---|---|---|
| 0 | 0.54 | 28.8 | 4.8 | 563 | 903 |
| 2 | 0.53 | 31.2 | NA | 489 | 1189 |
| 4 | 0.56 | 29.7 | NA | 509 | 955 |
| 6 | 0.52 | 30.0 | 4.7 | 1055 | 986 |

TABLE 55

| Week | Aw | L value | pH | Compression force (N/kg) | Cutting force (N/kg) |
| --- | --- | --- | --- | --- | --- |
| 0 | 0.54 | 28.8 | 4.8 | 563 | 903 |
| 2 | 0.55 | 30.1 | NA | 287 | 1120 |
| 4 | 0.57 | 27.5 | NA | 429 | 961 |
| 6 | 0.55 | 26.7 | 4.4 | 780 | 1108 |

Example 17

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 56

| Ingredient | Wt. % |
| --- | --- |
| Freeze-Dried Banana Powder | 18% |
| Yogurt Powder | 16.6% |
| Nutrilac Milk Protein Blend (A) | 18.3% |
| Strawberry Banana | 0.3% |
| Fiesta Pink | 0.5% |

The binder included a sweetener, a fat, a fruit concentrate, and a water-activity modulator. The sweetener was Tapioca Syrup 28DE, available from Briess Malt and Ingredients Co. The fat was coconut oil, available from ADM. The fruit concentrate was apple juice concentrate, available from Shaanxi Sanchuan Juice Co., LTD. The glycerin was a humectant, available from Harris and Ford (PG). The approximate weight percentages of the components relative to the overall formulation were as follows:

TABLE 57

| Ingredient | Wt. % |
| --- | --- |
| Tapioca Syrup 28DE | 9.5% |
| Coconut Oil | 4% |
| Apple Juice Concentrate | 22.8% |
| Glycerin | 10% |

The tapioca syrup and the coconut oil were combined and heated to 125° C. The orange pomace, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 2.4.

The formed bars were stored at 73° F. or 90° F. for up to six weeks. Water activity (Aw), color (L value), pH, compression force, and cutting force were measured at 0, 2, 4, and 6 weeks. The results are shown below in Table 58 (73° F.) and Table 59 (90° F.).

TABLE 58

| Week | Aw | L value | pH | Compression force (N/kg) | Cutting force (N/kg) |
| --- | --- | --- | --- | --- | --- |
| 0 | 0.53 | 35.2 | 5.4 | 1154 | 7314 |
| 2 | 0.60 | 40.6 | NA | 1640 | 2959 |
| 4 | 0.55 | 41.3 | NA | 3744 | 5323 |
| 6 | 0.55 | 40.2 | 5.3 | 1975 | 3067 |

TABLE 59

| Week | Aw | L value | pH | Compression force (N/kg) | Cutting force (N/kg) |
| --- | --- | --- | --- | --- | --- |
| 0 | 0.53 | 35.2 | 5.4 | 1154 | 7314 |
| 2 | 0.61 | 37.6 | NA | 2502 | 2830 |
| 4 | 0.54 | 19.0 | NA | 1565 | 4849 |
| 6 | 0.55 | 30.1 | 5.1 | 3079 | 5093 |

Example 18

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 60

| Ingredient | Wt. % |
| --- | --- |
| Freeze-Dried Banana Powder | 18% |
| Yogurt Powder | 16.6% |
| Nutrilac Milk Protein Blend (A) | 18.3% |
| Strawberry Banana | 0.3% |
| Fiesta Pink | 0.5% |

The binder included a sweetener, a fat, a fruit concentrate, and an acid. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The approximate weight percentages of the components relative to the overall formulation were as follows:

TABLE 61

| Ingredient | Wt. % |
| --- | --- |
| Tapioca Syrup 42DE | 27.5% |
| Coconut Oil | 4% |
| Apple Juice Concentrate | 14.2% |
| Citric Acid | 0.6% |

The tapioca syrup and the coconut oil were combined and heated to 125° C. The apple juice concentrate and the citric acid were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.5.

The formed bars were stored at 73° F. or 90° F. for up to six weeks. Water activity (Aw), color (L value), pH, compression force, and cutting force were measured at 0, 2, 4, and 6 weeks. The results are shown below in Table 62 (73° F.) and Table 63 (90° F.).

TABLE 62

| Week | Aw | L value | pH | Compression force (N/kg) | Cutting force (N/kg) |
|---|---|---|---|---|---|
| 0 | 0.56 | 33.8 | 4.9 | 7236 | 9942 |
| 2 | 0.61 | 43.5 | NA | 8645 | 13386 |
| 4 | 0.57 | 43.3 | NA | 6149 | 15678 |
| 6 | 0.54 | 42.6 | 4.9 | 6092 | 17787 |

TABLE 63

| Week | Aw | L value | pH | Compression force (N/kg) | Cutting force (N/kg) |
|---|---|---|---|---|---|
| 0 | 0.56 | 33.8 | 4.9 | 7236 | 9942 |
| 2 | 0.62 | 40.1 | NA | 7264 | 12373 |
| 4 | 0.59 | 37.2 | NA | 6811 | 14800 |
| 6 | 0.58 | 34.4 | 4.8 | 5906 | 15067 |

Example 19

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein (B), available from DSM. The flavoring was Strawberry Banana, available from IFF. The colorant was Fiesta Pink, available from GNT. The approximate weight percentages of the components relative to the overall formulation were as follows:

TABLE 64

| Ingredient | Wt. % |
|---|---|
| Freeze-Dried Banana Powder | 18% |
| Yogurt Powder | 16.6% |
| DSM Canola Protein (B) | 18.3% |
| Strawberry Banana | 0.3% |
| Fiesta Pink | 0.5% |

The binder included a sweetener, a fat, and a fruit concentrate. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The approximate weight percentages of the components relative to the overall formulation were as follows:

TABLE 65

| Ingredient | Wt. % |
|---|---|
| Tapioca Syrup 42DE | 14.5% |
| Coconut Oil | 4% |
| Apple Juice Concentrate | 27.8% |

The tapioca syrup and the coconut oil were combined and heated to 125° C. The apple juice concentrate was added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 1.9.

The formed bars were stored at 73° F. or 90° F. for up to six weeks. Water activity (Aw), color (L value), pH, compression force, and cutting force were measured at 0, 2, 4, and 6 weeks. The results are shown below in Table 66 (73° F.) and Table 67 (90° F.).

TABLE 66

| Week | Aw | L value | pH | Compression force (N/kg) | Cutting force (N/kg) |
|---|---|---|---|---|---|
| 0 | 0.58 | 29.3 | 4.7 | 1719 | 3062 |
| 2 | 0.58 | 31.0 | NA | 1509 | 3264 |
| 4 | 0.57 | 15.0 | NA | 1459 | 4141 |
| 6 | 0.59 | 30.9 | 4.7 | 2862 | 4935 |

TABLE 67

| Week | Aw | L value | pH | Compression force (N/kg) | Cutting force (N/kg) |
|---|---|---|---|---|---|
| 0 | 0.58 | 29.3 | 4.7 | 1719 | 3062 |
| 2 | 0.58 | 28.5 | NA | 733 | 2072 |
| 4 | 0.62 | 26.5 | NA | 962 | 2847 |
| 6 | 0.58 | 26.0 | 4.6 | 1387 | 2296 |

Example 20

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein B, available from DSM. The flavoring was Strawberry Banana, available from IFF. The colorant was Fiesta Pink, available from GNT. The approximate weight percentages of the components relative to the overall formulation were as follows:

TABLE 68

| Ingredient | Wt. % |
|---|---|
| Freeze-Dried Banana Powder | 18% |
| Yogurt Powder | 16.6% |
| DSM Canola Protein (B) | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 69

| Ingredient | Wt. % |
| --- | --- |
| Tapioca Syrup 42DE | 13.8% |
| Coconut Oil | 4% |
| Apple Juice Concentrate | 18.2% |
| Citric Acid | 0.3% |
| Glycerin | 10% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 1.3.

The formed bars were stored at 73° F. or 90° F. for up to six weeks. Water activity (Aw), color (L value), pH, compression force, and cutting force were measured at 0, 2, 4, and 6 weeks. The results are shown below in Table 70 (73° F.) and Table 71 (90° F.).

TABLE 70

| Week | Aw | L value | pH | Compression force (N/kg) | Cutting force (N/kg) |
| --- | --- | --- | --- | --- | --- |
| 0 | 0.54 | 32.2 | 4.6 | 356 | 847 |
| 2 | 0.51 | 32.0 | NA | 686 | 1383 |
| 4 | 0.51 | 15.8 | NA | 395 | 1394 |
| 6 | 0.53 | 30.0 | 4.6 | 794 | 1285 |

TABLE 71

| Week | Aw | L value | pH | Compression force (N/kg) | Cutting force (N/kg) |
| --- | --- | --- | --- | --- | --- |
| 0 | 0.54 | 32.2 | 4.6 | 356 | 847 |
| 2 | 0.54 | 29.2 | NA | 227 | 936 |
| 4 | 0.54 | 26.8 | NA | 341 | 1262 |
| 6 | 0.53 | 27.5 | 4.5 | 1810 | 1331 |

Example 21

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein (B), available from DSM. The flavoring was Strawberry Banana, available from IFF. The colorant was Fiesta Pink, available from GNT. The approximate weight percentages of the components relative to the overall formulation were as follows:

TABLE 72

| Ingredient | Wt. % |
| --- | --- |
| Freeze-Dried Banana Powder | 18% |
| Yogurt Powder | 16.6% |
| DSM Canola Protein (B) | 18.3% |

TABLE 72-continued

| Ingredient | Wt. % |
| --- | --- |
| Strawberry Banana | 0.3% |
| Fiesta Pink | 0.5% |

The binder included a sweetener, a fat, a fruit concentrate, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The glycerin was a humectant, available from Harris and Ford (PG). The approximate weight percentages of the components relative to the overall formulation were as follows:

TABLE 73

| Ingredient | Wt. % |
| --- | --- |
| Tapioca Syrup 42DE | 16.6% |
| Coconut Oil | 4% |
| Apple Juice Concentrate | 20.7% |
| Glycerin | 5% |

The tapioca syrup and the coconut oil were combined and heated to 125° C. The apple juice concentrate and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 1.25.

The formed bars were stored at 73° F. or 90° F. for up to six weeks. Water activity (Aw), color (L value), pH, compression force, and cutting force were measured at 0, 2, 4, and 6 weeks. The results are shown below in Table 74 (73° F.) and Table 75 (90° F.).

TABLE 74

| Week | Aw | L value | pH | Compression force (N/kg) | Cutting force (N/kg) |
| --- | --- | --- | --- | --- | --- |
| 0 | 0.58 | 27.3 | 4.7 | 553 | 1745 |
| 2 | 0.54 | 32.0 | NA | 713 | 2254 |
| 4 | 0.56 | 30.8 | NA | 966 | 3031 |
| 6 | 0.54 | 30.8 | 4.8 | 2020 | 2122 |

TABLE 75

| Week | Aw | L value | pH | Compression force (N/kg) | Cutting force (N/kg) |
| --- | --- | --- | --- | --- | --- |
| 0 | 0.54 | 27.3 | 4.7 | 553 | 1745 |
| 2 | 0.54 | 29.4 | NA | 614 | 1178 |
| 4 | 0.54 | 26.9 | NA | 893 | 2439 |
| 6 | 0.53 | 27.2 | 4.7 | 1314 | 1687 |

Example 22

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein (B), available from DSM. The flavoring was Strawberry Banana, available from IFF. The colorant was Fiesta Pink, available from GNT. The approximate weight percentages of the components relative to the overall formulation were as follows:

TABLE 76

| Ingredient | Wt. % |
| --- | --- |
| Freeze-Dried Banana Powder | 18% |
| Yogurt Powder | 16.6% |
| DSM Canola Protein (B) | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 28DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 77

| Ingredient | Wt. % |
| --- | --- |
| Tapioca Syrup 28DE | 24.9% |
| Coconut Oil | 4% |
| Apple Juice Concentrate | 12.5% |
| Citric Acid | 0.3% |
| Glycerin | 5% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.5.

The formed bars were stored at 73° F. or 90° F. for up to six weeks. Water activity (Aw), color (L value), pH, compression force, and cutting force were measured at 0, 2, 4, and 6 weeks. The results are shown below in Table 78 (73° F.) and Table 79 (90° F.).

TABLE 78

| Week | Aw | L value | pH | Compression force (N/kg) | Cutting force (N/kg) |
| --- | --- | --- | --- | --- | --- |
| 0 | 0.57 | 24.5 | 4.6 | 1791 | 4353 |
| 2 | 0.54 | 31.2 | NA | 1775 | 4437 |
| 4 | 0.56 | 30.1 | NA | 2311 | 4570 |
| 6 | 0.53 | 30.8 | 4.7 | 3001 | 3439 |

TABLE 79

| Week | Aw | L value | pH | Compression force (N/kg) | Cutting force (N/kg) |
| --- | --- | --- | --- | --- | --- |
| 0 | 0.57 | 24.5 | 4.6 | 1791 | 4353 |
| 2 | 0.55 | 28.3 | NA | 1280 | 2651 |

TABLE 79-continued

| Week | Aw | L value | pH | Compression force (N/kg) | Cutting force (N/kg) |
| --- | --- | --- | --- | --- | --- |
| 4 | 0.57 | 26.7 | NA | 1132 | 3689 |
| 6 | 0.53 | 27.0 | 4.4 | 4717 | 4463 |

Example 23

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was DSM Canola Protein (B), available from DSM. The flavoring was Strawberry Banana, available from IFF. The colorant was Fiesta Pink, available from GNT. The approximate weight percentages of the components relative to the overall formulation were as follows:

TABLE 80

| Ingredient | Wt. % |
| --- | --- |
| Freeze-Dried Banana Powder | 18% |
| Yogurt Powder | 16.6% |
| DSM Canola Protein (B) | 18.3% |
| Strawberry Banana | 0.3% |
| Fiesta Pink | 0.5% |

The binder included a sweetener, a fat, and a fruit concentrate. The sweetener was Tapioca Syrup 28DE, available from Briess Malt and Ingredients Co. The fat was coconut oil, available from ADM. The fruit concentrate was apple juice concentrate, available from Shaanxi Sanchuan Juice Co., LTD. The approximate weight percentages of the components relative to the overall formulation were as follows:

TABLE 81

| Ingredient | Wt. % |
| --- | --- |
| Tapioca Syrup 28DE | 27.8% |
| Coconut Oil | 4% |
| Apple Juice Concentrate | 14.5% |

The tapioca syrup and the coconut oil were combined and heated to 125° C. The apple juice concentrate was added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 0.5.

The formed bars were stored at 73° F. or 90° F. for up to six weeks. Water activity (Aw), color (L value), pH, compression force, and cutting force were measured at 0, 2, 4, and 6 weeks. The results are shown below in Table 82 (73° F.) and Table 83 (90° F.).

TABLE 82

| Week | Aw | L value | pH | Compression force (N/kg) | Cutting force (N/kg) |
|---|---|---|---|---|---|
| 0 | 0.57 | 26.8 | 4.6 | 4101 | 8501 |
| 2 | 0.59 | 31.5 | NA | 4683 | 14922 |
| 4 | 0.59 | 16.2 | NA | 4315 | 13992 |
| 6 | 0.55 | 30.7 | 4.8 | 10619 | 15985 |

TABLE 83

| Week | Aw | L value | pH | Compression force (N/kg) | Cutting force (N/kg) |
|---|---|---|---|---|---|
| 0 | 0.57 | 26.8 | 4.6 | 4101 | 8501 |
| 2 | 0.59 | 29.4 | NA | 4525 | 8665 |
| 4 | 0.60 | 27.8 | NA | 3237 | 10697 |
| 6 | 0.60 | 26.8 | 4.7 | 7693 | 11604 |

Example 24

Data Analysis

Figure 2:
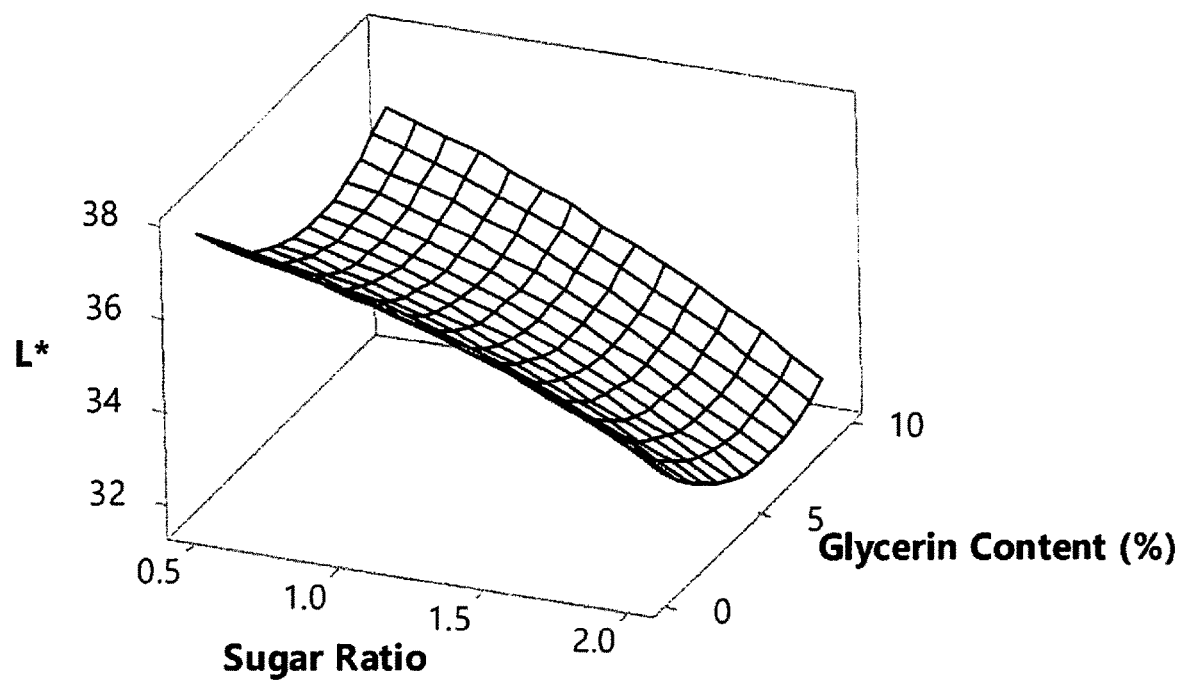
FIG. 2 shows a graph of L value on the y-axis, sugar ratio (fruit concentrate:sweetener) on the x-axis, and glycerin content (%) on the z-axis.

The results from Examples 5 to 23 were analyzed. A graph with Cutting force (N) on the y-axis, sugar ratio (fruit concentrate:sweetener) on the x-axis, and glycerin content (%) on the z-axis is shown in FIG. 1. A graph of L on the y-axis, sugar ratio (fruit concentrate:sweetener) on the x-axis, and glycerin content (%) on the z-axis is shown in FIG. 2.

Individual and Composite Desirability was determined by a multi-variate regression using the statistical software MiniTab. Holding the DE of the syrup to 42 DE, the optimum fruit concentrate:sweetener was 0.5, the optimum citric acid wt. percentage was 0.6%, and the optimum glycerin content was about 10%, leading to Composite Desirability of 0.83.

Example 25

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Arla Nutrilac 83% Protein, available from Arla Foods Ingredients. The flavoring was Peach Mango, available from IFF. The colorant was Exberry Shade Mandarin, available from GNT. The approximate weight percentages of the components relative to the overall formulation were as follows:

TABLE 84

| Ingredient | Wt. % |
|---|---|
| Freeze-Dried Banana Powder | 20% |
| Arla Nutrilac 83% Protein | 19.4% |
| Yogurt Powder | 17.5% |
| Peach Mango | 0.3% |
| Exberry Shade Mandarin | 2% |

The binder included a sweetener, a fat, a fruit concentrate, a water-activity modulator, and water. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The glycerin was a humectant, available from Harris and Ford (PG). The approximate weight percentages of the components relative to the overall formulation were as follows:

TABLE 85

| Ingredient | Wt. % |
|---|---|
| Tapioca Syrup 42 DE | 7.8% |
| Coconut Oil | 4% |
| Apple Juice Concentrate | 25% |
| Glycerin | 2% |
| Water | 2% |

The tapioca syrup and the coconut oil were combined and heated to 125° C. The apple juice concentrate, the water, and the glycerin were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 3.2.

The formed bars were stored at 73° F. or 90° F. for up to nine months. Water activity (Aw), color (L value), and cutting force were measured at 2 weeks, 1 month, 2 months, 3 months, 4 months, 5 months, 6 months, 7 months, 8 months, and 9 months for the bars stored at 73° F. or at 2 weeks, 1 month, 2 months, or 3 months for the bars stored at 90° F. The results are shown below in Table 86 (73° F.) and Table 87 (90° F.).

TABLE 86

| Time | Aw | L value | Cutting force (N/kg) |
|---|---|---|---|
| 2 weeks | NA | NA | NA |
| 1 month | 0.55 | 57.8 | 3937 |
| 2 months | 0.58 | 55.9 | 3577 |
| 3 months | 0.57 | 63.3 | 2743 |
| 4 months | 0.58 | 50.1 | 2382 |
| 5 months | 0.57 | 50.6 | 5638 |
| 6 months | 0.53 | 33.1 | 2020 |
| 7 months | 0.53 | 45.8 | 3883 |
| 8 months | NA | 43.1 | 4826 |
| 9 months | 0.52 | 42.2 | 4084 |

TABLE 87

| Time | Aw | L value | Cutting force (N/kg) |
|---|---|---|---|
| 2 weeks | 0.59 | 51.9 | 2447 |
| 1 month | 0.58 | 44.8 | 4786 |
| 2 months | 0.61 | 35.6 | 4551 |
| 3 months | 0.63 | 35.8 | 4971 |

Example 26

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac 83% Protein, available from Arla Foods Ingredients. The flavoring was Peach Mango, available from IFF. The colorant was Exberry Shade Mandarin, available from GNT. The approximate weight percentages of the components relative to the overall formulation were as follows:

TABLE 88

| Ingredient | Wt. % |
| --- | --- |
| Freeze-Dried Banana Powder | 16.8% |
| Arla Nutrilac 83% Protein | 17.4% |
| Yogurt Powder | 15.5% |
| Peach Mango | 0.3% |
| Exberry Shade Mandarin | 2% |

The binder included a sweetener, a fat, a fruit concentrate, a water-activity modulator, and water. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The glycerin was a humectant, available from Harris and Ford (PG). The approximate weight percentages of the components relative to the overall formulation were as follows:

TABLE 89

| Ingredient | Wt. % |
| --- | --- |
| Tapioca Syrup 42 DE | 40% |
| Coconut Oil | 4% |
| Glycerin | 2% |
| Water | 2% |

The tapioca syrup and the coconut oil were combined and heated to 125° C. The orange pomace, the citric acid, and the glycerin were added to form the binder. The binder was combined with the mixture of dry ingredients and combined via blending in a Kitchen Aid mixer or ribbon blender. The resulting composition was cold-pressed into bars.

The formed bars were stored at 73° F. or 90° F. for up to nine months. Water activity (Aw), color (L value), and cutting force were measured at 2 weeks, 1 month, 2 months, 3 months, 4 months, 5 months, 6 months, 7 months, 8 months, and 9 months for the bars stored at 73° F. or at 2 weeks, 1 month, 2 months, or 3 months for the bars stored at 90° F. The results are shown below in Table 90 (73° F.) and Table 91 (90° F.).

TABLE 90

| Time | Aw | L value | Cutting force (N/kg) |
| --- | --- | --- | --- |
| 2 weeks | NA | NA | NA |
| 1 month | 0.58 | 63.4 | 3478 |
| 2 months | 0.58 | 64.9 | 2965 |
| 3 months | 0.60 | NA | 3825 |
| 4 months | 0.60 | 62.6 | 3459 |
| 5 months | 0.58 | 40.2 | 6037 |
| 6 months | 0.58 | 59.0 | 4016 |
| 7 months | 0.58 | NA | 6011 |
| 8 months | NA | NA | 6890 |
| 9 months | 0.57 | 54.1 | 5697 |

TABLE 91

| Time | Aw | L value | Cutting force (N/kg) |
| --- | --- | --- | --- |
| 2 weeks | 0.60 | 56.3 | 3262 |
| 1 month | 0.59 | 51.3 | 2874 |
| 2 months | 0.59 | 43.6 | 3577 |
| 3 months | 0.65 | NA | 4501 |

Example 27

Food Bar

A formulation for a food bar was prepared by mixing the following dry ingredient blend with a binder.

The dry ingredient blend included a fruit base, a yogurt, a protein, a flavoring, a colorant, and produce fragments. The fruit base was Freeze-Dried Banana Powder available from Van Drunen Farms. The yogurt was yogurt powder, available from Grande. The protein was Nutrilac 83% Protein, available from Arla Foods Ingredients. The flavoring was Mixed Berry, available from IFF. The colorant was Exberry Shade Bordeaux, available from GNT. The approximate weight percentages of the components relative to the overall formulation were as follows:

TABLE 92

| Ingredient | Wt. % |
| --- | --- |
| Freeze-Dried Banana Powder | 20% |
| Arla Nutrilac 83% Protein | 19.4% |
| Yogurt Powder | 17.5% |
| Mixed Berry Flavor | 0.2% |
| Exberry Shade Bordeaux | 0.2% |

The binder included a sweetener, a fat, a fruit concentrate a water-activity modulator, and water. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The glycerin was a humectant, available from Harris and Ford (PG). The approximate weight percentages of the components relative to the overall formulation were as follows:

TABLE 93

| Ingredient | Wt. % |
| --- | --- |
| Tapioca Syrup 42 DE | 9.6% |
| Coconut Oil | 4% |
| Apple Juice Concentrate | 25% |
| Glycerin | 2% |
| Water | 2% |

The tapioca syrup and the coconut oil were combined and heated to 125° C. The apple juice concentrate, the glycerin, and the water were added to form the binder. The binder was combined with the mixture of dry ingredients and combined via blending in a Kitchen Aid mixer or ribbon blender. The resulting composition was cold-pressed into bars.

The resulting sugar ratio of fruit concentrate:sweetener in the bar was about 2.6.

The formed bars were stored at 73° F. or 90° F. for up to nine months. Water activity (Aw), color (L value), and cutting force were measured at 2 weeks, 1 month, 2 months, 3 months, 4 months, 5 months, 6 months, 7 months, 8 months, and 9 months for the bars stored at 73° F. or at 2 weeks, 1 month, 2 months, or 3 months for the bars stored at 90° F. The results are shown below in Table 94 (73° F.) and Table 95 (90° F.).

TABLE 94

| Time | Aw | L value | Cutting force (N/kg) |
|---|---|---|---|
| 2 weeks | NA | NA | NA |
| 1 month | 0.56 | 53.1 | 4410 |
| 2 months | 0.57 | 52.9 | 3344 |
| 3 months | 0.57 | 60.0 | 3849 |
| 4 months | 0.59 | 51.2 | 3797 |
| 5 months | 0.59 | 55.4 | 6918 |
| 6 months | 0.54 | 33.1 | 1646 |
| 7 months | 0.55 | 47.6 | 5023 |
| 8 months | NA | 42.5 | 1952 |
| 9 months | 0.43 | 44.3 | 16080 |

TABLE 95

| Time | Aw | L value | Cutting force (N/kg) |
|---|---|---|---|
| 2 weeks | 0.59 | 48.6 | 4037 |
| 1 month | 0.59 | 45.6 | 5990 |
| 2 months | 0.61 | 35.4 | 5144 |
| 3 months | 0.62 | 37.3 | 4890 |

Example 28

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac 83% Protein, available from Arla Foods Ingredients. The flavoring was Mixed Berry, available from IFF. The colorant was Exberry Shade Bordeaux, available from GNT. The approximate weight percentages of the components relative to the overall formulation were as follows:

TABLE 96

| Ingredient | Wt. % |
|---|---|
| Freeze-Dried Banana Powder | 16.8% |
| Arla Nutrilac 83% Protein | 17.4% |
| Yogurt Powder | 15.5% |
| Mixed Berry Flavor | 0.2% |
| Exberry Shade Bordeaux | 0.2% |

The binder included a sweetener, a fat, a water-activity modulator, and water. The sweetener was Tapioca Syrup 42DE, available from Briess Malt and Ingredients Co. The fat was coconut oil, available from ADM. The glycerin was a humectant, available from Harris and Ford (PG). The approximate weight percentages of the components relative to the overall formulation were as follows:

TABLE 97

| Ingredient | Wt. % |
|---|---|
| Tapioca Syrup 42 DE | 41.8% |
| Coconut Oil | 4% |

TABLE 97-continued

| Ingredient | Wt. % |
|---|---|
| Glycerin | 2% |
| Water | 2% |

The tapioca syrup and the coconut oil were combined and heated to 125° C. The orange pomace, the citric acid, and the glycerin were added to form the binder. The binder was combined with the mixture of dry ingredients and combined via blending in a Kitchen Aid mixer or ribbon blender. The resulting composition was cold-pressed into bars.

The formed bars were stored at 73° F. or 90° F. for up to nine months. Water activity (Aw), color (L value), and cutting force were measured at 2 weeks, 1 month, 2 months, 3 months, 4 months, 5 months, 6 months, 7 months, 8 months, and 9 months for the bars stored at 73° F. or at 2 weeks, 1 month, 2 months, or 3 months for the bars stored at 90° F. The results are shown below in Table 98 (73° F.) and Table 99 (90° F.).

TABLE 98

| Time | Aw | L value | Cutting force (N/kg) |
|---|---|---|---|
| 2 weeks | NA | NA | NA |
| 1 month | 0.59 | 53.4 | 5301 |
| 2 months | 0.58 | 55.8 | 3865 |
| 3 months | 0.58 | 60.1 | 3648 |
| 4 months | 0.60 | 52.1 | 3539 |
| 5 months | 0.59 | 52.5 | 7486 |
| 6 months | 0.56 | 36.1 | 3511 |
| 7 months | 0.56 | 50.8 | 5808 |
| 8 months | NA | 48.1 | 4810 |
| 9 months | 0.48 | 49.3 | 5399 |

TABLE 99

| Time | Aw | L value | Cutting force (N/kg) |
|---|---|---|---|
| 2 weeks | 0.60 | 48.4 | 3778 |
| 1 month | 0.60 | 48.8 | 6167 |
| 2 months | 0.63 | 43.9 | 4225 |
| 3 months | 0.62 | 44.9 | 3682 |

Example 29

A texture analyzer with a chisel probe was used to measure the amount of cutting force required. The food bar of Example 1 was stored for 8 months at 73° F. The force needed to cut through the food bar was measured at 0, 4, and 8 months.

TABLE 100

| Example 1 | | Example 2 | |
|---|---|---|---|
| Time point (at 73° F.) | Cutting force (N/kg) | Time point (at 90° F.) | Cutting force (N/kg) |
| 0 months | 5148 | 0 weeks (equivalent to 0 months at 73° F.) | 6979 |
| 4 months | 10853 | 4 weeks (equivalent to about 3 months at 73° F.) | 4147 |
| 8 months | 20607 | 6 weeks (equivalent to about 4 months at 73° F.) | 5204 |

Example 30

Component Optimization

Several food bars were made according to the general procedures above. Measurements, such as water activity, cutting forces, L values, and desirability were determined. L value is on a scale from 1-100 and is based on the Hunter Colorimeter color scale where 0 is black and 100 is white. D-value is desirability and is on a scale of 0-1, where 1 is maximum desirability. The protein blend is Nutrilac Protein by Arla.

TABLE 101

| Sugar Ratio | Glycerin (wt. %) | Citric Acid (wt. %) | Sweet-ener (DE) | Water Activity | Cutting force (N/kg) | L value | Desir-ability |
|---|---|---|---|---|---|---|---|
| 0.5 | 10 | 0.6 | 42 | 0.54 | 6738 | 33.6 | 0.81 |
| 1   | 8  | 0.4 | 42 | 0.52 | 6211 | 32.4 | 0.83 |
| 1.2 | 8  | 0.4 | 42 | 0.53 | 6231 | 31.9 | 0.83 |
| 1.2 | 8  | 0.4 | 28 | 0.53 | 4951 | 33.5 | 0.88 |
| 1.7 | 6  | 0.5 | 42 | 0.54 | 5978 | 30.5 | 0.76 |

Example 31

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Peach Mango, available from IFF. The colorant was Exberry Shade Mandarin, available from GNT. The approximate weight percentages of the components relative to the overall formulation were as follows:

TABLE 102

| Ingredient | Wt. % |
|---|---|
| Freeze-Dried Banana Powder | 18% |
| Yogurt Powder | 16.6% |
| Nutrilac Milk Protein Blend (A) | 18.3% |
| Peach Mango | 0.3% |
| Exberry Shade Mandarin | 0.8% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 103

| Ingredient | Wt. % |
|---|---|
| Tapioca Syrup 42 DE | 18.2% |
| Coconut Oil | 4% |
| Apple Juice Concentrate | 21.6% |

TABLE 103-continued

| Ingredient | Wt. % |
|---|---|
| Citric Acid | 0.2% |
| Glycerin | 2% |

The glycerin, the tapioca syrup, and the coconut oil were combined and heated to 125° C. The citric acid and the apple juice concentrate added to form the binder. The binder was combined with the mixture of dry ingredients and combined via blending in a Kitchen Aid mixer or ribbon blender to produce Dough A.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Peach Mango, available from IFF. The colorants were Fiesta Pink and Exberry Shade Mandarin, available from GNT. The approximate weight percentages of the components relative to the overall formulation were as follows:

TABLE 104

| Ingredient | Wt. % |
|---|---|
| Freeze-Dried Banana Powder | 18% |
| Yogurt Powder | 16.6% |
| Nutrilac Milk Protein Blend (A) | 18.3% |
| Peach Mango | 0.3% |
| Exberry Shade Mandarin | 0.8% |
| Fiesta Pink | 0.5% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was orange pomace, available from PepsiCo. The acid was citric acid, available from Cargill. The glycerin was a humectant, available from Harris and Ford (PG). The approximate weight percentages of the components relative to the overall formulation were as follows:

TABLE 105

| Ingredient | Wt. % |
|---|---|
| Tapioca Syrup 42 DE | 18.2% |
| Coconut Oil | 4% |
| Apple Juice Concentrate | 21.1% |
| Citric Acid | 0.2% |
| Glycerin | 2% |

The glycerin, the tapioca syrup, and the coconut oil were combined and heated to 125° C. The citric acid and the apple juice concentrate added to form the binder. The binder was combined with the mixture of dry ingredients and combined via blending in a Kitchen Aid mixer or ribbon blender to produce Dough B. Dough A and Dough B were combined and mixed for about one minute. The resulting composition was cold-pressed into bars.

The resulting sugar ratio of fruit concentrate:sweetener in the bar was about 1.2.

The formed bars were stored at 73° F. or 90° F. for up to nine months. Water activity (Aw) and cutting force were measured at 1 month, 2 months, 3 months, 4 months, 5 months, 6 months, 7 months, 8 months, and 9 months for the bars stored at 73° F. or at 1 month, 2 months, or 3 months for the bars stored at 90° F. The results are shown below in Table 106 (73° F.) and Table 107 (90° F.).

TABLE 106

| Time | Aw | Cutting force (N/kg) |
|---|---|---|
| 1 month | 0.53 | 8515 |
| 2 months | 0.56 | 7139 |
| 3 months | 0.55 | 10378 |
| 4 months | 0.55 | 10820 |
| 5 months | ND | 9003 |
| 6 months | 0.55 | 10375 |
| 7 months | 0.60 | 13674 |
| 8 months | 0.46 | 15912 |
| 9 months | 0.58 | 16578 |

TABLE 107

| Time | Cutting force (N/kg) |
|---|---|
| 1 month | 13558 |
| 2 months | 9619 |
| 3 months | 14872 |

Example 32

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The approximate weight percentages of the components relative to the overall formulation were as follows:

TABLE 108

| Ingredient | Wt. % |
|---|---|
| Freeze-Dried Banana Powder | 18% |
| Yogurt Powder | 16.6% |
| Nutrilac Milk Protein Blend (A) | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was orange pomace, available from PepsiCo. The acid was citric acid, available from Cargill. The glycerin was a humectant, available from Harris and Ford (PG). The approximate weight percentages of the components relative to the overall formulation were as follows:

TABLE 109

| Ingredient | Wt. % |
|---|---|
| Tapioca Syrup 42 DE | 18.2% |
| Coconut Oil | 4% |
| Apple Juice Concentrate | 21.9% |
| Citric Acid | 0.2% |
| Glycerin | 2% |

The glycerin, the tapioca syrup, and the coconut oil were combined and heated to 125° C. The citric acid and the apple juice concentrate added to form the binder. The binder was combined with the mixture of dry ingredients and combined via blending in a Kitchen Aid mixer or ribbon blender to produce Dough A.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorants were Fiesta Pink and Celestial Yellow, available from GNT. The approximate weight percentages of the components relative to the overall formulation were as follows:

TABLE 110

| Ingredient | Wt. % |
|---|---|
| Freeze-Dried Banana Powder | 18% |
| Yogurt Powder | 16.6% |
| Nutrilac Milk Protein Blend (A) | 18.3% |
| Strawberry Banana | 0.3% |
| Celestial Yellow | 0.8% |
| Fiesta Pink | 0.3% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was orange pomace, available from PepsiCo. The acid was citric acid, available from Cargill. The glycerin was a humectant, available from Harris and Ford (PG). The approximate weight percentages of the components relative to the overall formulation were as follows:

TABLE 111

| Ingredient | Wt. % |
|---|---|
| Tapioca Syrup 42 DE | 18.2% |
| Coconut Oil | 4% |
| Apple Juice Concentrate | 21.6% |
| Citric Acid | 0.2% |
| Glycerin | 2% |

The glycerin, the tapioca syrup, and the coconut oil were combined and heated to 125° C. The citric acid and the apple juice concentrate added to form the binder. The binder was combined with the mixture of dry ingredients and combined via blending in a Kitchen Aid mixer or ribbon blender to produce Dough B. Dough A and dough B were combined and mixed for about one minute. The resulting composition was cold-pressed into bars.

The resulting sugar ratio of fruit concentrate:sweetener in the bar was about 1.2.

The formed bars were stored at 73° F. or 90° F. for up to nine months. Water activity (Aw) and cutting force were measured at 1 month, 2 months, 3 months, 4 months, 5 months, 6 months, 7 months, 8 months, and 9 months for the bars stored at 73° F. or at 1 month, 2 months, or 3 months for the bars stored at 90° F. The results are shown below in Table 112 (73° F.) and Table 113 (90° F.).

TABLE 112

| Time | Aw | Cutting force (N/kg) |
| --- | --- | --- |
| 1 month | 0.53 | 5909 |
| 2 months | 0.56 | 6659 |
| 3 months | 0.55 | 8422 |
| 4 months | 0.54 | 9195 |
| 5 months | ND | 25438 |
| 6 months | 0.53 | 8958 |
| 7 months | 0.54 | 8077 |
| 8 months | 0.51 | 13936 |
| 9 months | 0.54 | 13500 |

TABLE 113

| Time | Cutting force (N/kg) |
| --- | --- |
| 1 month | 10757 |
| 2 months | 9525 |
| 3 months | 11528 |

Example 33

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Berry Flavor, available from IFF. The colorant was Exberry Shade Bordeaux, available from GNT. The approximate weight percentages of the components relative to the overall formulation were as follows:

TABLE 114

| Ingredient | Wt. % |
| --- | --- |
| Freeze-Dried Banana Powder | 18% |
| Yogurt Powder | 16.6% |
| Nutrilac Milk Protein Blend (A) | 18.3% |
| Berry Flavor | 0.3% |
| Exberry Shade Bordeaux | 0.2% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 115

| Ingredient | Wt. % |
| --- | --- |
| Tapioca Syrup 42DE | 18.2% |
| Coconut Oil | 4% |
| Apple Juice Concentrate | 22.2% |
| Citric Acid | 0.2% |
| Glycerin | 2% |

The glycerin, the tapioca syrup, and the coconut oil were combined and heated to 125° C. The citric acid and the apple juice concentrate added to form the binder. The binder was combined with the mixture of dry ingredients and combined via blending in a Kitchen Aid mixer or ribbon blender to produce Dough A.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Berry Flavor, available from IFF. The colorant was Exberry Shade Bordeaux, available from GNT. The approximate weight percentages of the components relative to the overall formulation were as follows:

TABLE 116

| Ingredient | Wt. % |
| --- | --- |
| Freeze-Dried Banana Powder | 18% |
| Yogurt Powder | 16.6% |
| Nutrilac Milk Protein Blend (A) | 18.3% |
| Berry Flavor | 0.3% |
| Exberry Shade Bordeaux | 1% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was apple juice concentrate, available from Shaanxi Sanchuan Juice Co., LTD. The acid was citric acid, available from Cargill. The glycerin was a humectant, available from Harris and Ford (PG). The approximate weight percentages of the components relative to the overall formulation were as follows:

TABLE 117

| Ingredient | Wt. % |
| --- | --- |
| Tapioca Syrup 42DE | 18.2% |
| Coconut Oil | 4% |
| Apple Juice Concentrate | 22.2% |
| Citric Acid | 0.2% |
| Glycerin | 2% |

The glycerin, the tapioca syrup, and the coconut oil were combined and heated to 125° C. The citric acid and the apple juice concentrate added to form the binder. The binder was combined with the mixture of dry ingredients and combined via blending in a Kitchen Aid mixer or ribbon blender to produce dough B. Dough A and dough B were combined and mixed for about one minute. The resulting composition was cold-pressed into bars.

The resulting sugar ratio of fruit concentrate:sweetener in the bar was about 1.2.

The formed bars were stored at 73° F. or 90° F. for up to nine months. Water activity (Aw) and cutting force were measured at 1 month, 2 months, 3 months, 4 months, 5 months, 6 months, 7 months, 8 months, and 9 months for the bars stored at 73° F. or at 1 month, 2 months, or 3 months for the bars stored at 90° F. The results are shown below in Table 118 (73° F.) and Table 119 (90° F.).

TABLE 118

| Time | Aw | Cutting force (N/kg) |
| --- | --- | --- |
| 1 month | 0.54 | 11704 |
| 2 months | 0.57 | 9270 |
| 3 months | 0.55 | 10509 |
| 4 months | 0.56 | 12973 |
| 5 months | ND | 13023 |
| 6 months | 0.51 | 11390 |
| 7 months | 0.55 | 14995 |
| 8 months | 0.44 | 17643 |
| 9 months | 0.52 | 19576 |

TABLE 119

| Time | Cutting force (N/kg) |
| --- | --- |
| 1 month | 12672 |
| 2 months | 16217 |
| 3 months | 14918 |

Example 34

Food Bar

A formulation for a food bar was prepared by mixing the following dry ingredient blend with a binder.

The dry ingredient blend included a fruit base, a yogurt, a protein, a flavoring, and a colorant. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta, available from GNT. The approximate weight percentages of the components relative to the overall formulation were as follows:

TABLE 120

| Ingredient | Wt. % |
| --- | --- |
| Freeze-Dried Banana Powder | 18% |
| Nutrilac Milk Protein Blend | 16.6% |
| Yogurt Powder | 18.3% |
| Strawberry Banana | 0.3% |
| Fiesta Pink | 0.5% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was orange pomace, available from PepsiCo. The acid was citric acid, available from Cargill. The glycerin was a humectant, available from Harris and Ford (PG). The approximate weight percentages of the components relative to the overall formulation were as follows:

TABLE 121

| Ingredient | Wt. % |
| --- | --- |
| Tapioca Syrup 42 DE | 21.1% |
| Coconut Oil | 4.5% |
| Apple Juice Concentrate | 10.6% |
| Citric Acid | 0.2% |
| Glycerin | 10% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars. The ratio of fruit concentrate:sweetener syrup was about 0.5.

Example 35

Food Bar

A formulation for a food bar was prepared by mixing the following dry ingredient blend with a binder.

The dry ingredient blend included a fruit base, a yogurt, a protein, a flavoring, a colorant, and a fiber. The fruit base was Freeze-Dried Banana Powder available from Van Drunen Farms. The yogurt was yogurt powder, available from Grande. The protein was Nutrilac Milk Protein Blend (A), available from Arla Foods Ingredients. The flavoring was Strawberry Banana, available from IFF. The colorant was Fiesta Pink, available from GNT. The fiber was inulin, available from Beneo. The approximate weight percentages of the components relative to the overall formulation were as follows:

TABLE 122

| Ingredient | Wt. % |
| --- | --- |
| Freeze-Dried Banana Powder | 16.8% |
| Nutrilac Milk Protein Blend | 18.2% |
| Yogurt Powder | 11.6% |
| Strawberry Banana | 0.3% |
| Fiesta Pink | 0.5% |
| Inulin | 6.2% |

The binder included a sweetener, a fat, a fruit concentrate, an acid, and a water-activity modulator. The sweetener was Tapioca Syrup 42DE, available from Briess Malt and Ingredients Co. The fat was coconut oil, available from ADM. The fruit concentrate was orange pomace, available from PepsiCo. The acid was citric acid, available from Cargill. The glycerin was a humectant, available from Harris and Ford (PG). The approximate weight percentages of the components relative to the overall formulation were as follows:

TABLE 123

| Ingredient | Wt. % |
| --- | --- |
| Tapioca Syrup 42 DE | 21.1% |
| Coconut Oil | 4.5% |
| Apple Juice Concentrate | 10.6% |
| Citric Acid | 0.2% |
| Glycerin | 10% |

The tapioca syrup and the coconut oil were combined and heated to 125° C. The apple juice concentrate, the citric acid, and the glycerin were added to form the binder. The binder was combined with the mixture of dry ingredients and combined via blending in a Kitchen Aid mixer or ribbon blender. The resulting composition was cold-pressed into bars. The ratio of fruit concentrate:sweetener syrup was about 0.5.

Example 36

Hardness Measurement

The initial hardness cutting force values were measured as described above. The cutting force values are shown in Table 124.

TABLE 124

| Example No. | Cutting force (N/kg) |
|---|---|
| 34 | 14,676 |
| 35 | 9,136 |

The following numbered clauses include embodiments that are contemplated and non-limiting:

Clause 1. A cold-pressed food bar comprising,
a mixture of dry ingredients comprising a protein, and
a binder comprising a sweetener and an acid,
wherein the food bar has an initial cutting force value of less than about 15,000 N/kg.

Clause 2. The food bar of clause 1, any other suitable clause, or any combination of suitable clauses, wherein the initial cutting force of the food bar is less than about 12,000 N/kg.

Clause 3. The food bar of clause 2, any other suitable clause, or any combination of suitable clauses, wherein the cutting force of the food bar increases less than 75% compared to the initial cutting force value after six months at 73° F.

Clause 4. The food bar of clause 3, any other suitable clause, or any combination of suitable clauses, wherein the cutting force of the food bar increases less than 50% compared to the initial cutting force value after six months at 73° F.

Clause 5. The food bar of clause 4, any other suitable clause, or any combination of suitable clauses, wherein the food bar has an initial L value and an L value at about 6 months of storage at 73° F., and the absolute value of the difference between the initial L value and the L value at about 6 months of storage at 73° F. (ΔL) is less than about 10.

Clause 6. The food bar of clause 4, any other suitable clause, or any combination of suitable clauses, wherein the mixture of dry ingredients includes a fruit base and a dairy base.

Clause 7. The food bar of clause 6, any other suitable clause, or any combination of suitable clauses, wherein the binder includes a fat.

Clause 8. The food bar of clause 1, any other suitable clause, or any combination of suitable clauses, wherein the mixture of dry ingredients includes a fruit base and a dairy base.

Clause 9. The food bar of clause 8, any other suitable clause, or any combination of suitable clauses, wherein the fruit base is a powder.

Clause 10. The food bar of clause 9, any other suitable clause, or any combination of suitable clauses, wherein the fruit base comprises freeze-dried banana powder.

Clause 11. The food bar of clause 8, any other suitable clause, or any combination of suitable clauses, wherein the dairy base comprises a yogurt or a milk.

Clause 12. The food bar of clause 11, any other suitable clause, or any combination of suitable clauses, wherein the yogurt comprises yogurt powder.

Clause 13. The food bar of clause 8, any other suitable clause, or any combination of suitable clauses, wherein the protein comprises a dairy-based protein, a vegetable-based protein, or a mixture thereof.

Clause 14. The food bar of clause 13, any other suitable clause, or any combination of suitable clauses, wherein the protein comprises the dairy-based protein.

Clause 15. The food bar of clause 8, any other suitable clause, or any combination of suitable clauses, wherein the mixture of dry ingredients includes a flavoring, a colorant, produce fragments, or a mixture thereof.

Clause 16. The food bar of clause 15, any other suitable clause, or any combination of suitable clauses, wherein the mixture of dry ingredients includes a flavoring.

Clause 17. The food bar of clause 16, any other suitable clause, or any combination of suitable clauses, wherein the flavoring comprises strawberry, banana, peach, mango, mixed berry, or a combination thereof.

Clause 18. The food bar of clause 15, any other suitable clause, or any combination of suitable clauses, wherein the mixture of dry ingredients includes the colorant.

Clause 19. The food bar of clause 18, any other suitable clause, or any combination of suitable clauses, wherein the colorant is pink, mandarin, or bordeaux.

Clause 20. The food bar of clause 15, any other suitable clause, or any combination of suitable clauses, wherein the mixture of dry ingredients includes produce fragments.

Clause 21. The food bar of clause 20, any other suitable clause, or any combination of suitable clauses, wherein the produce fragments comprise fragments of strawberries, watermelon, grapes, banana, peaches, mangos, pineapples, apples, cherries, oranges, grapefruits, mandarins, pomelos, clementines, blueberries, raspberries, pears, blackberries, plums, kiwis, melons, lemons, limes, tangerines, coconut, or a combination thereof.

Clause 22. The food bar of clause 21, any other suitable clause, or any combination of suitable clauses, wherein the produce fragments are microdried strawberry fragments.

Clause 23. The food bar of clause 1, any other suitable clause, or any combination of suitable clauses, wherein the sweetener has a dextrose equivalents (DE) value of at least about 30.

Clause 24. The food bar of clause 23, any other suitable clause, or any combination of suitable clauses, wherein the DE of the sweetener is at least about 40.

Clause 25. The food bar of clause 23, any other suitable clause, or any combination of suitable clauses, wherein the binder includes a fat.

Clause 26. The food bar of clause 25, any other suitable clause, or any combination of suitable clauses, wherein the fat comprises coconut oil, palm oil, tallow, shea butter, cocoa butter, or a highly saturated fat.

Clause 27. The food bar of clause 23, any other suitable clause, or any combination of suitable clauses, wherein the binder includes a fruit concentrate and a water-activity modulator.

Clause 28. The food bar of clause 27, any other suitable clause, or any combination of suitable clauses, wherein a ratio of the weight percent of fruit concentrate to the weight percent of sweetener is at least 0.4.

Clause 29. The food bar of clause 28, any other suitable clause, or any combination of suitable clauses, wherein the ratio of the weight percent of fruit concentrate to the weight percent of sweetener is at least 0.8.

Clause 30. The food bar of clause 28, any other suitable clause, or any combination of suitable clauses, wherein the ratio of the weight percent of fruit concentrate to the weight percent of sweetener is about 0.8 to about 1.4.

Clause 31. The food bar of clause 27, any other suitable clause, or any combination of suitable clauses, wherein the fruit concentrate comprises a juice concentrate a pomace, or a mixture thereof.

Clause 32. The food bar of clause 31, any other suitable clause, or any combination of suitable clauses, wherein the fruit concentrate comprises a fruit concentrate formed from strawberries, watermelon, grapes, banana, peaches, mangos, pineapples, apples, cherries, oranges, grapefruits, mandarins, pomelos, clementines, blueberries, raspberries, pears, blackberries, plums, kiwis, melons, lemons, limes, tangerines, coconut, or a combination thereof.

Clause 33. The food bar of clause 31, any other suitable clause, or any combination of suitable clauses, wherein the fruit concentrate comprises a pomace formed from strawberries, watermelon, grapes, banana, peaches, mangos, pineapples, apples, cherries, oranges, grapefruits, mandarins, pomelos, clementines, blueberries, raspberries, pears, blackberries, plums, kiwis, melons, lemons, limes, tangerines, coconut, or a combination thereof.

Clause 34. The food bar of clause 31, any other suitable clause, or any combination of suitable clauses, wherein the sweetener comprises tapioca syrup or brown rice syrup.

Clause 35. The food bar of clause 23, any other suitable clause, or any combination of suitable clauses, wherein the acid comprises citric acid, malic acid, lactic acid, acetic acid, tartaric acid, or a weak organic acid.

Clause 36. The food bar of clause 23, any other suitable clause, or any combination of suitable clauses, wherein the water-activity modulator comprises glycerin.

Clause 37. The food bar of clause 1, any other suitable clause, or any combination of suitable clauses, wherein the mixture of dry ingredients are at least about 30% by weight of the food bar.

Clause 38. The food bar of clause 37, any other suitable clause, or any combination of suitable clauses, wherein the mixture of dry ingredients are at least about 40% by weight of the food bar.

Clause 39. The food bar of clause 38, any other suitable clause, or any combination of suitable clauses, wherein the mixture of dry ingredients are at least about 50% by weight of the food bar.

Clause 40. The food bar of clause 39, any other suitable clause, or any combination of suitable clauses, wherein the mixture of dry ingredients are at least about 60% by weight of the food bar.

Clause 41. The food bar of clause 37, any other suitable clause, or any combination of suitable clauses, wherein the mixture of dry ingredients are about 30% to about 80% by weight of the food bar.

Clause 42. The food bar of clause 41, any other suitable clause, or any combination of suitable clauses, wherein the mixture of dry ingredients are about 50% to about 70% by weight of the food bar.

Clause 43. The food bar of clause 1, any other suitable clause, or any combination of suitable clauses, wherein the binder is at least about 20% by weight of the food bar.

Clause 44. The food bar of clause 43, any other suitable clause, or any combination of suitable clauses, wherein the binder is at least about 30% by weight of the food bar.

Clause 45. The food bar of clause 44, any other suitable clause, or any combination of suitable clauses, wherein the binder is about 20% to about 70% by weight of the food bar.

Clause 46. The food bar of clause 45, any other suitable clause, or any combination of suitable clauses, wherein the binder is about 20% to about 50% by weight of the food bar.

Clause 47. The food bar of clause 1, any other suitable clause, or any combination of suitable clauses, wherein the food bar has a ΔL of less than about 25 after about 6 months at 73° F.

Clause 48. The food bar of clause 47, any other suitable clause, or any combination of suitable clauses, wherein the food bar has a ΔL of less than about 15 after about 6 months at 73° F.

Clause 49. The food bar of clause 48, any other suitable clause, or any combination of suitable clauses, wherein the food bar has a ΔL of less than about 10 after about 6 months at 73° F.

Clause 50. The food bar of clause 49, any other suitable clause, or any combination of suitable clauses, wherein the food bar has a ΔL of about 5 after about 6 months at 73° F.

Clause 51. The food bar of clause 1, comprising a soluble fiber.

Clause 52. A process for making a food bar according, the process comprising
combining a mixture of dry ingredients and the binder to form a blended composition, and
pressing the blended composition to form a food bar.

Clause 53. The process of clause 52, comprising forming the binder by heating the sweetener and the fat.

Clause 54. The process of clause 52, any other suitable clause, or any combination of suitable clauses, wherein the step of pressing the blended composition is performed by cold-pressing the blended composition.

Clause 55. The process of clause 52, any other suitable clause, or any combination of suitable clauses, wherein the mixture of dry ingredients, the binder, or the blended composition are not extruded.

Clause 56. A cold-pressed food bar comprising,
a mixture of dry ingredients comprising a protein, and
a binder comprising an about 20 to about 30 DE sweetener and an about 35 to about 50 DE sweetener,
wherein the food bar has an initial cutting force value of less than 15,000 N/kg.

Clause 57. The food bar of clause 56, any other suitable clause, or any combination of suitable clauses, wherein the food bar does not comprise an acid.

Clause 58. The food bar of clause 57, any other suitable clause, or any combination of suitable clauses, wherein the cutting force of the food bar increases less than 75% compared to the initial cutting force value after six months at 73° F.

Clause 59. The food bar of clause 58, any other suitable clause, or any combination of suitable clauses, wherein the cutting force of the food bar increases less than 50% compared to the initial cutting force value after six months at 73° F.

Clause 60. A cold-pressed food bar comprising,
a mixture of dry ingredients comprising a fruit base, a dairy base, a protein, a flavoring, a colorant, and
a binder comprising a fruit concentrate, a sweetener, a fat, an acid, and a water activity modulator,
wherein the food bar has a Composite Desirability greater than about 0.8.

Clause 61. The food bar of clause 60, any other suitable clause, or any combination of suitable clauses, wherein the food bar has an initial cutting force value of less than 15,000 N/kg.

Clause 62. The food bar of clause 61, any other suitable clause, or any combination of suitable clauses, wherein the cutting force of the food bar increases less than 75% compared to the initial cutting force value after six months at 73° F.

The preceding description enables others skilled in the art to use the technology in various embodiments and with various modifications as are suited to the particular use contemplated. In accordance with the provisions of the patent statutes, the principles and modes of operation of this disclosure have been explained and illustrated in exemplary embodiments. Accordingly, the present invention is not limited to the particular described and/or exemplified embodiments.

It is intended that the scope of disclosure of the present technology be defined by the following claims. However, it must be understood that this disclosure may be practiced otherwise than is specifically explained and illustrated without departing from its spirit or scope. It should be understood by those skilled in the art that various alternatives to the described embodiments may be used in practicing the claims without departing from the spirit and scope as defined in the following claims.

The scope of this disclosure should be determined, not only with reference to the above description, but should be determined with reference to the appended claims, along with the full scope of equivalents to which the claims are entitled. It is anticipated and intended that future developments will occur, and that the disclosed compositions and methods will be incorporated into those future developments.

The invention claimed is:

1. A cold-pressed food bar comprising,
   a mixture of dry ingredients comprising a protein, and
   a binder comprising (i) a ratio of fruit concentrate:sweetener in the range of about 1.5 to about 2.5, (ii) about 10 wt. % glycerin, and (iii) an acid,
   wherein, after six weeks at 73° F., the food bar has a cutting force value that increased less than 75% from an initial cutting force value and has a color change (ΔL) of less than 5.

2. The food bar of claim 1, wherein the food bar has a cutting force after six months at 73° F. that has increased less than 50% compared to the initial cutting force value.

3. The food bar of claim 2, wherein the mixture of dry ingredients includes a fruit base and a dairy base.

4. The food bar of claim 3, wherein the binder includes a fat.

5. The food bar of claim 1, wherein the mixture of dry ingredients includes a fruit base and a dairy base.

6. The food bar of claim 5, wherein the fruit base comprises freeze-dried banana powder.

7. The food bar of claim 5, wherein the dairy base comprises a yogurt or a milk.

8. The food bar of claim 1, wherein the sweetener has a dextrose equivalents (DE) value of at least about 30.

9. The food bar of claim 8, wherein the binder includes a fat.

10. The food bar of claim 8, wherein the binder includes a fruit concentrate and a water-activity modulator.

11. The food bar of claim 10, wherein the fruit concentrate comprises a juice concentrate, a pomace, or a mixture thereof.

12. The food bar of claim 1, wherein the sweetener has a dextrose equivalent value of between 28 DE and 42 DE.

13. The food bar of claim 12, wherein the sweetener is Tapioca syrup 42DE.

14. A cold-pressed food bar comprising,
   a mixture of dry ingredients comprising a fruit base, a dairy base, a protein, a flavoring, and a colorant, and
   a binder comprising a ratio of fruit concentrate:sweetener in the range of about 1.5 to about 2.5, about 10 wt. % glycerin, a fat, an acid, and a water activity modulator,
   wherein after six weeks at 73° F., the food bar has a color change (ΔL) of less than 5, and wherein the cold-pressed food bar has a Composite Desirability of at least 0.7.

15. The food bar of claim 14, wherein the food bar has an initial cutting force value of less than 15,000 N/kg at 73° F.

16. The food bar of claim 15, wherein the food bar has a cutting force after six months at 73° F. that has increased less than 75% compared to the initial cutting force value.

* * * * *